US012038151B2

United States Patent
Chun

(10) Patent No.: US 12,038,151 B2
(45) Date of Patent: Jul. 16, 2024

(54) COLLAPSIBLE AND EXPANDABLE PORTABLE LAMP AND SOLAR-CHARGING BATTERY ASSEMBLY

(71) Applicant: Alice Chun, New York, NY (US)

(72) Inventor: Alice Chun, New York, NY (US)

( * ) Notice: Subject to any disclaimer, the term of this patent is extended or adjusted under 35 U.S.C. 154(b) by 0 days.

(21) Appl. No.: 17/856,070

(22) Filed: Jul. 1, 2022

(65) Prior Publication Data

US 2023/0008449 A1    Jan. 12, 2023

Related U.S. Application Data

(60) Provisional application No. 63/220,617, filed on Jul. 12, 2021.

(51) Int. Cl.
*F21S 9/03*    (2006.01)
*F21L 4/08*    (2006.01)
(Continued)

(52) U.S. Cl.
CPC ............... *F21S 9/037* (2013.01); *F21L 4/08* (2013.01); *F21V 1/14* (2013.01); *F21V 23/04* (2013.01);
(Continued)

(58) Field of Classification Search
CPC .... F21S 9/037; F21V 1/06; F21V 1/14; F21V 23/04; F21V 3/026
See application file for complete search history.

(56) References Cited

U.S. PATENT DOCUMENTS 2,245,715 A    6/1941  Rieck
3,553,866 A    1/1971  Redford et al.
(Continued)

FOREIGN PATENT DOCUMENTS

CN    1162496 A  * 10/1997  ............. A63B 43/06
CN    101576204 A    11/2009
(Continued)

OTHER PUBLICATIONS

New Atlas | Environment, "LuminAID solar-powered inflatable lantern—simply a good idea", Nov. 15, 2011, New Atlas, 11 pages. (Year: 2011).*
(Continued)

*Primary Examiner* — Alan B Cariaso
(74) *Attorney, Agent, or Firm* — Edell, Shapiro & Finnan, LLC

(57) ABSTRACT

An apparatus is provided comprising a photovoltaic panel configured to convert light into electricity, a battery configured to receive electricity from the photovoltaic panel and to store the electricity, a charging port configured to receive stored electricity from the battery and provide the stored electricity, at least one light emitting device configured to receive electricity from the battery and to emit light, a button configured to actuate the at least one light emitting device, and a diffuser surrounding the at least one light emitting device, wherein the diffuser diffuses light emitted by the at least one light emitting device, and wherein the diffuser has a first collapsed configuration and a second expanded configuration. Also provided is a method of distributing light from a light producing device, and an assembly comprising the apparatus and a bag that includes a pocket configured to receive the apparatus.

20 Claims, 17 Drawing Sheets

(51) Int. Cl.
  *F21V 1/06*    (2006.01)
  *F21V 1/14*    (2006.01)
  *F21V 3/02*    (2006.01)
  *F21V 23/04*   (2006.01)
  *F21Y 115/10*  (2016.01)

(52) U.S. Cl.
  CPC ............... *F21V 1/06* (2013.01); *F21V 3/026* (2013.01); *F21Y 2115/10* (2016.08); *Y02B 20/72* (2013.01)

(56) References Cited

U.S. PATENT DOCUMENTS

| | | | |
|---|---|---|---|
| 4,234,432 A | 11/1980 | Tarpley, Jr. | |
| 4,243,432 A | 1/1981 | Jordan et al. | |
| 4,503,563 A | 3/1985 | Johnson | |
| 4,692,557 A | 9/1987 | Samuelson | |
| 4,979,339 A | 12/1990 | Jones et al. | |
| 5,083,250 A | 1/1992 | Malcolm | |
| 5,231,781 A | 8/1993 | Dunbar | |
| 5,427,258 A | 6/1995 | Krishnakumar et al. | |
| 5,603,648 A | 2/1997 | Kea | |
| 5,782,552 A | 7/1998 | Green et al. | |
| D397,470 S | 8/1998 | Bassford et al. | |
| 5,888,156 A | 3/1999 | Cmiel et al. | |
| 5,890,794 A | 4/1999 | Abtahi et al. | |
| 5,947,581 A | 9/1999 | Schrimmer et al. | |
| 6,013,985 A | 1/2000 | Green et al. | |
| 6,018,960 A | 2/2000 | Parienti | |
| 6,027,225 A | 2/2000 | Martin et al. | |
| 6,193,392 B1 | 2/2001 | Lodhie | |
| 6,200,000 B1 | 3/2001 | Burnidge | |
| 6,254,247 B1 | 7/2001 | Carson | |
| 6,276,815 B1 | 8/2001 | Wu | |
| 6,280,344 B1 | 8/2001 | Robb | |
| 6,371,637 B1 | 4/2002 | Atchinson et al. | |
| D465,874 S | 11/2002 | Gravin et al. | |
| D468,037 S | 12/2002 | Jarvis | |
| 6,499,857 B1 | 12/2002 | Lumley | |
| 6,502,953 B2 | 1/2003 | Hajianpour | |
| D485,003 S | 1/2004 | Olson | |
| 7,318,656 B1 | 1/2008 | Merine | |
| 7,322,137 B2 | 1/2008 | Machala | |
| 7,377,667 B2 | 5/2008 | Richmond | |
| 7,458,698 B2 | 12/2008 | Heathcock et al. | |
| 7,500,746 B1 | 3/2009 | Howell et al. | |
| 7,611,396 B2 | 11/2009 | Schnuckle | |
| 7,690,812 B2 | 4/2010 | Roberts et al. | |
| 7,699,495 B2 | 4/2010 | Au | |
| 7,753,576 B2 | 7/2010 | Marcinkewicz et al. | |
| D627,090 S | 11/2010 | Sanoer | |
| 7,825,325 B2 | 11/2010 | Kennedy et al. | |
| 7,857,490 B1 | 12/2010 | Fett et al. | |
| D639,494 S | 6/2011 | Schrimmer et al. | |
| 8,011,816 B1 | 9/2011 | Janda | |
| 8,550,663 B2 | 10/2013 | Tong | |
| D694,445 S | 11/2013 | Shiu | |
| D706,968 S | 6/2014 | Mcdonough et al. | |
| 8,845,126 B1 | 9/2014 | Martzall | |
| 9,016,886 B2 | 4/2015 | Snyder | |
| D728,835 S | 5/2015 | Metlen et al. | |
| D728,836 S | 5/2015 | Metlen et al. | |
| 9,022,614 B2 | 5/2015 | Chin-Huan | |
| 9,080,736 B1 * | 7/2015 | Salzinger ............... H05B 45/10 | |
| D738,553 S | 9/2015 | Fletcher | |
| D741,530 S | 10/2015 | Snyder | |
| 9,200,770 B2 | 12/2015 | Stork et al. | |
| 9,228,708 B2 | 1/2016 | Dings et al. | |
| 9,347,629 B2 | 5/2016 | Stork et al. | |
| D759,869 S | 6/2016 | Huang | |
| D775,390 S | 12/2016 | Zimmer | |
| D777,362 S | 1/2017 | Killion et al. | |
| 10,359,173 B2 | 7/2019 | Chun | |
| 10,514,140 B2 | 12/2019 | Sreshta et al. | |
| D881,431 S | 4/2020 | Burczyk et al. | |
| 10,612,738 B1 | 4/2020 | Sreshta et al. | |
| 10,704,746 B2 | 7/2020 | Jeong et al. | |
| 10,760,746 B2 | 9/2020 | Sreshta et al. | |
| 10,955,097 B2 | 3/2021 | Sreshta et al. | |
| D932,078 S | 9/2021 | Sreshta et al. | |
| 11,242,962 B2 | 2/2022 | Stork et al. | |
| 11,248,755 B2 | 2/2022 | Sreshta et al. | |
| 11,252,809 B2 | 2/2022 | Sreshta et al. | |
| 11,255,501 B2 | 2/2022 | Stork et al. | |
| 11,592,147 B2 | 2/2023 | Stork et al. | |
| 2002/0085329 A1 | 7/2002 | Lee et al. | |
| 2003/0169590 A1 | 9/2003 | Sorli et al. | |
| 2004/0130888 A1 | 7/2004 | Twardawski | |
| 2005/0002188 A1 | 1/2005 | Bucher et al. | |
| 2005/0007773 A1 | 1/2005 | Austin | |
| 2005/0261091 A1 | 11/2005 | Buschfort | |
| 2005/0265029 A1 | 12/2005 | Epstein et al. | |
| 2006/0108612 A1 | 5/2006 | Richmond | |
| 2006/0193126 A1 | 8/2006 | Kuelbs et al. | |
| 2006/0221595 A1 | 10/2006 | Payne | |
| 2006/0279956 A1 * | 12/2006 | Richmond ............... F21V 15/01 362/803 |
| 2006/0291217 A1 | 12/2006 | Vanderschuit | |
| 2007/0014125 A1 | 1/2007 | Chu | |
| 2007/0091594 A1 | 4/2007 | Soon | |
| 2007/0109772 A1 | 5/2007 | Chang | |
| 2007/0147063 A1 | 6/2007 | Collomb et al. | |
| 2007/0183143 A1 | 9/2007 | Allsop et al. | |
| 2008/0013317 A1 | 1/2008 | Hinds | |
| 2008/0032589 A1 | 2/2008 | Sun | |
| 2008/0130272 A1 | 6/2008 | Waters | |
| 2008/0175005 A1 | 7/2008 | Kellmann et al. | |
| 2008/0175006 A1 | 7/2008 | Kellmann et al. | |
| 2008/0266860 A1 | 10/2008 | Marcinkewicz et al. | |
| 2008/0273319 A1 | 11/2008 | VanderSchuit | |
| 2008/0311820 A1 | 12/2008 | Murdock | |
| 2009/0053946 A1 | 2/2009 | Ashby | |
| 2009/0133636 A1 | 5/2009 | Richmond | |
| 2009/0141491 A1 | 6/2009 | Chu | |
| 2009/0175029 A1 | 7/2009 | Chiang | |
| 2009/0268439 A1 | 10/2009 | Chen | |
| 2009/0269045 A1 | 10/2009 | Astill | |
| 2009/0322495 A1 | 12/2009 | Richmond | |
| 2010/0286910 A1 | 11/2010 | Hudson | |
| 2010/0308005 A1 | 12/2010 | Callanan | |
| 2011/0018439 A1 | 1/2011 | Fabbri et al. | |
| 2011/0118062 A1 | 5/2011 | Krysiak et al. | |
| 2012/0069554 A1 | 3/2012 | Toya et al. | |
| 2012/0120642 A1 | 5/2012 | Sreshta et al. | |
| 2012/0134143 A1 | 5/2012 | Lederer et al. | |
| 2012/0193660 A1 | 8/2012 | Donofrio et al. | |
| 2012/0200235 A1 | 8/2012 | Shuy et al. | |
| 2012/0224359 A1 | 9/2012 | Chun | |
| 2013/0107506 A1 | 5/2013 | Mustafa | |
| 2013/0187569 A1 | 7/2013 | Chin-Huan | |
| 2013/0335953 A1 | 12/2013 | Gold et al. | |
| 2014/0003037 A1 | 1/2014 | Kuelzow et al. | |
| 2014/0043802 A1 | 2/2014 | Dings et al. | |
| 2014/0049942 A1 | 2/2014 | Chilton et al. | |
| 2014/0118997 A1 | 5/2014 | Snyder | |
| 2014/0146525 A1 | 5/2014 | Lueptow | |
| 2015/0036325 A1 | 2/2015 | Cohen | |
| 2015/0219294 A1 | 8/2015 | Sreshta et al. | |
| 2016/0040836 A1 | 2/2016 | Sreshta et al. | |
| 2016/0109077 A1 | 4/2016 | Chun | |
| 2016/0341380 A1 | 11/2016 | Stork et al. | |
| 2017/0211760 A9 | 7/2017 | Sreshta et al. | |
| 2017/0234493 A1 | 8/2017 | Stork et al. | |
| 2018/0128438 A1 | 5/2018 | Sreshta et al. | |
| 2019/0063721 A1 | 2/2019 | Chun | |
| 2019/0137056 A1 | 5/2019 | Sreshta et al. | |
| 2020/0116320 A1 | 4/2020 | Sreshta et al. | |
| 2020/0300431 A1 | 9/2020 | Sreshta et al. | |
| 2021/0048155 A1 | 2/2021 | Sreshta et al. | |
| 2021/0396368 A1 | 12/2021 | Sreshta et al. | |

(56) References Cited

U.S. PATENT DOCUMENTS

| | | | |
|---|---|---|---|
| 2022/0299175 A1 | 11/2022 | Stork et al. | |
| 2023/0250925 A1 | 8/2023 | Stork et al. | |

FOREIGN PATENT DOCUMENTS

| | | | |
|---|---|---|---|
| CN | 101641550 A | 2/2010 | |
| CN | 101690402 A | 3/2010 | |
| CN | 101731815 A | 6/2010 | |
| CN | 201523778 U | 7/2010 | |
| CN | 101886746 A | 11/2010 | |
| CN | 201715273 U | 1/2011 | |
| CN | 102116415 A | 7/2011 | |
| CN | 102379502 A | 3/2012 | |
| CN | 102403929 A | 4/2012 | |
| CN | 202203682 U | 4/2012 | |
| CN | 202511013 U | 10/2012 | |
| CN | 202884514 U | 4/2013 | |
| CN | 203215307 U | 9/2013 | |
| CN | 203489018 U | 3/2014 | |
| DE | 20209138 U1 | 9/2002 | |
| DE | 102006022185 A1 | 11/2007 | |
| JP | 2006047829 A | 2/2006 | |
| JP | 2006201307 A | 8/2006 | |
| JP | 2009278763 A | 11/2009 | |
| WO | 01/83067 A2 | 11/2001 | |
| WO | 2006/070724 A1 | 7/2006 | |
| WO | 2013/165462 A1 | 11/2013 | |

OTHER PUBLICATIONS

Solar Products | d.light, "Solar Product, Find the best d.light for you", Jan. 11, 2024 1:49 PM (Jan. 11, 2024), https://www.dlight.com/products/, S3 Learning Light, S30 Family Lantern, S200, T200, S610, T200R, etc., 15 pages. (Year: 2024).*

Fast Shipped | Retailer of Pool Supplies & Halloween Costumes—FastShipped.com, Jan. 11, 2024 1:59 PM (Jan. 11, 2024), Above Ground Pool Parts, Polygroup Summer Waves TM, SFX 600 Filtration System, 11 pages. (Year: 2024).*

Cumberbatch et al, "Self-Assembled Solar Lighting Systems", Oct. 11, 2009, Proc.ISES Solar World Congress, pp. 1-10.

D Light Nova SI00, Nova Series, www.dlightdesign.com/products, printed Jan. 11, 2024.

'Indiegogo.com' [online]. "LuminAID: An Inflatable Solar Light, Story" Published on Feb. 15, 2012, retrieved from the Internet: URL:<https://www.indiegogo.com/projects/luminaid-an-inflatable-solar-light—3#/updates/all>.

International Search Report and The Written Opinion of the International Searching Authority, International Application No. PCT/US2012/061848, filed Jan. 8, 2013.

International Search Report for International Application No. PCT/US14/10246, mailed Aug. 27, 2014.

International Search Report for International Application No. PCT/US2016/014222, dated Apr. 8, 2016 (2 pages).

Nonfinal Office Action, U.S. Appl. No. 13/163,239, mailed Apr. 24, 2015.

Nonfinal Office Action, U.S. Appl. No. 13/450,974, mailed Mar. 17, 2015.

Nonfinal office action, U.S. Appl. No. 13/163,239, mailed Jun. 5, 2013.

Nonfinal Office Action, U.S. Appl. No. 14/643,519, dated Jul. 6, 2015.

Clark Boyd, "Luminaid: Shining a light on disasters," Published on Feb. 13, 2012, https://www.bbc.com/future/article/20120207-lantern-shines-light-on-disasters, 4 pages.

Laurie Goering, "Blow-up solar lantern lights up Haiti's prospects", Thomson Reuters Foundation, Jun. 22, 2012, https://news.trust.org/item/20120622150100-k9yos/, 11 pages.

Indiegogo.com, "Exclusive Interview with LuminAi—Give Light, Get Light", Jan. 10, 2012, https://go.indiegogo.com/blog/2012/01/campaign-profile-luminaid-give-light-get-light.html, 8 pages.

Jesper Jonsson, "Project Soul Cell", YouTube, downloaded from the internet Jan. 22, 2024, https://www.youtube.com/watch?v=wHe4mlmdg31, 2 pages.

Kirsten Korosec, "An Inflatable Solar light For Disaster Relief ( or Camping)," Nov. 17, 2011, https://www.zdnet.com/article/an-inflatable-solar-light-for-disaster-relief-or-camping/, downloaded from the internet Jan. 22, 2024, 5 pages.

Lichauco De Leon, "Sunlight-powered 'bulbs' made from plastic bottles light up homes", The Guardian, Dec. 23, 2011, https://www.theguardian.com/environment/2011/dec/23/sunlight-bulbs-plastic-bottles-light, 5 pages.

'luminaidlab.com, "LuminAID The World's First Inflatable Solar Light," downloaded from the internet Jan. 22, 2024, https://web.archive.org/web/20120104065934/http:/luminaidlab.com/blog/, 15 pages.

Mini-BoGo Flashlight, https://web.archive.org/web/20120119082315/https:/www.bogolight.com/Articles.asp?ID=137, downloaded from the internet Jan. 22, 2024, 3 pages.

*MPOWERD Inc.* v. *LuminAID Lab, LLC*, IPR2018-01524, "Petition for Inter Partes Review of 9,347,629", dated Feb. 25, 2020, 22 pages.

Windell Oskay, "Simple Solar Circuits", https://www.evilmadscientist.com/2008/simple-solar-circuits/, Oct. 22, 2008, 12 pages.

Andrea Sreshta, et al., "Solar-Powered Inflatable Light", May 23, 2011, https://web.archive.org/web/20110704112641/http:/ibridgenetwork.org/columbia/ir_m10-104, 2 pages.

Andrea Sreshta, et al., Transcript, "TEDx636EleventhAve", #simpledesign, YouTube, downloaded from the internet Dec. 3, 2023, 10 pages.

Sheila Kennedy, "Portable Light Project", http://www.portablelight.org/, Sep. 11, 2008, 2 pages.

Andrea Sreshta, et al., Transcript, "TEDx636EleventhAve", #simpledesign, YouTube, downloaded from the internet Jan. 9, 2011, 3 pages.

Laura Briggs, et al., "Brunner Grant Proposal", Oct. 22, 2008, 6 pages.

"Solar Ripples", Sticks & Stones, May 19, 2009, sticks-and-stones-2009.blogspot.com, 19 pages.

"Core77 Design Award 2011: Solar Puff, Runner-Up for DIY/Hack/Mod", Aug. 23, 2011, https://www.core77.com/posts/20279/, 6 pages.

* cited by examiner

FIGURE 8A
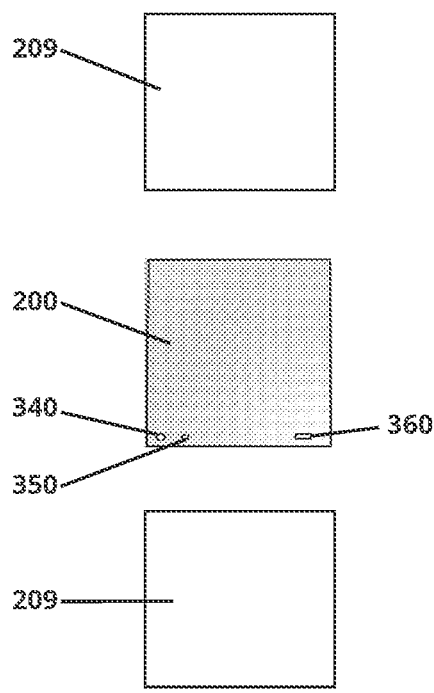
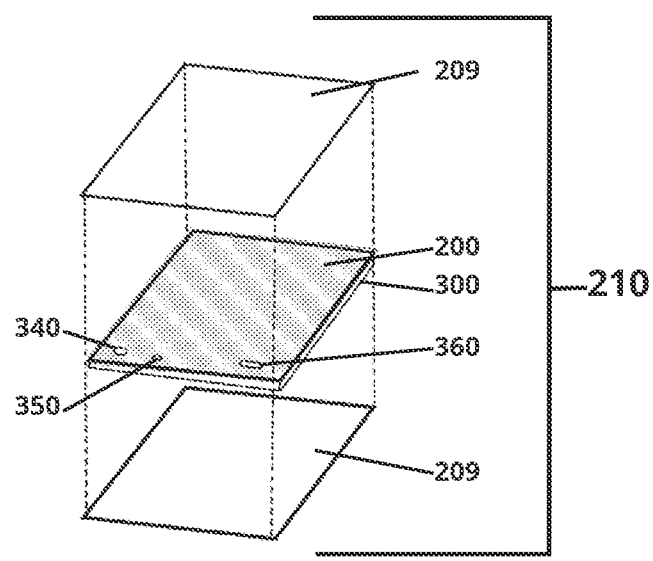
FIGURE 8B

FIG. 10A  FIG. 10B  FIG. 10C  FIG. 10D
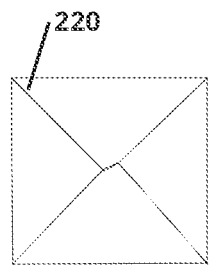 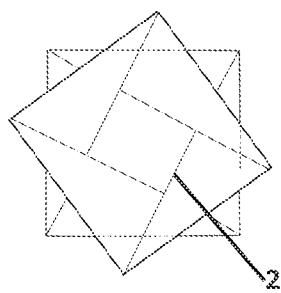 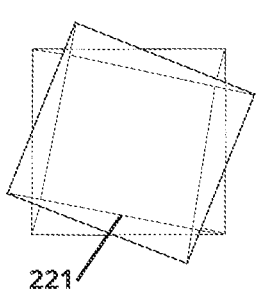 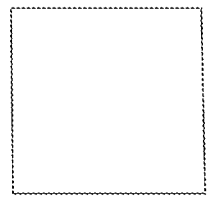
FIG. 10E  FIG. 10F  FIG. 10G  FIG. 10H
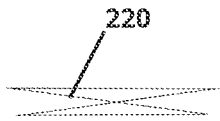  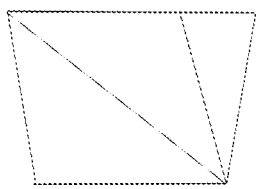 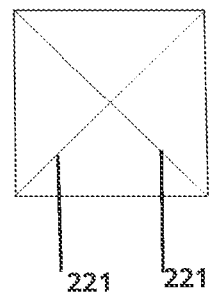

COLLAPSIBLE AND EXPANDABLE PORTABLE LAMP AND SOLAR-CHARGING BATTERY ASSEMBLY

CROSS REFERENCE TO RELATED APPLICATION

This application claims priority to U.S. Provisional Application No. 63/220,617, filed Jul. 12, 2021, entitled "COLLAPSIBLE PORTABLE LAMP AND SOLAR-CHARGING BATTERY ASSEMBLY," the disclosure of which is incorporated herein by reference in its entirety.

BACKGROUND

1. Technical Field

Present invention embodiments relate generally to solar-powered light assemblies, and more specifically, to portable light assemblies with solar-rechargeable power banks.

2. Discussion of the Related Art

An electric light is a device that produces visible light from electric power. Typically, electric lights are used to provide interior lighting or lighting during nighttime activities. Electric lighting can be provided to remote locations or locations lacking in infrastructure using off-grid energy sources, such as generators, batteries, and/or solar panels. Thus, portable sources of electricity and lighting can have a variety of uses, such as providing power to individuals for their phones or electronic devices during travel, camping, outdoor activities, and/or during emergencies or power outages.

Conventional solar-charged lighting solutions are typically expensive and difficult to transport, making them particularly costly to deploy in large numbers. Acid cell battery or fuel-powered lighting solutions have the disadvantage of recurring cost and limited resources, and renewable lighting solutions can require expensive components and can be large and difficult to ship.

SUMMARY

According to one embodiment of the present invention, an apparatus is provided comprising a photovoltaic panel configured to convert light into electricity, a battery configured to receive electricity from the photovoltaic panel and to store the electricity, a charging port configured to receive stored electricity from the battery and provide the stored electricity, at least one light emitting device configured to receive electricity from the battery and to emit light, a button configured to actuate the at least one light emitting device, and a diffuser surrounding the at least one light emitting device, wherein the diffuser diffuses light emitted by the at least one light emitting device, and wherein the diffuser has a first collapsed configuration and a second expanded configuration. Also provided is a method of distributing light from a light producing device, and an assembly comprising the apparatus and a bag that includes a pocket configured to receive the apparatus.

BRIEF DESCRIPTION OF THE DRAWINGS

Generally, like reference numerals in the various figures are utilized to designate like components.

FIG. 8A is a view of components of a top assembly including a bladder encasing a solar panel and PCBA between two layers of a flexible material in accordance with an embodiment of the present invention;

FIG. 8B is an exploded view depicting a top assembly including a bladder encasing a solar panel and PCBA between two layers of a flexible material in accordance with an embodiment of the present invention;

FIGS. 10A-10D are top views of a folding sequence for an expandable bladder with open top and bottom sides in accordance with an embodiment of the present invention;

FIGS. 10E-10H are side views in elevation of a folding sequence for an expandable bladder with open top and bottom sides in accordance with an embodiment of the present invention;

DETAILED DESCRIPTION

Figure 1A:
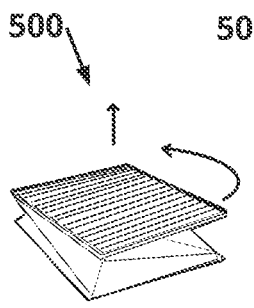
FIGS. 1A-1D are views in perspective depicting a lamp being unfolded from a collapsed state in accordance with an embodiment of the present invention.
Figure 1B:
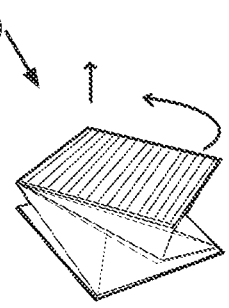
Figure 1C:
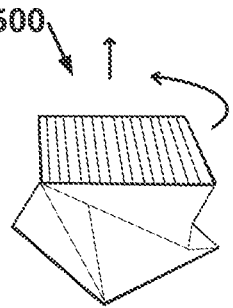

Present invention embodiments relate generally to portable electronic devices, and more specifically, to portable lights and power banks. Families and individuals who reside in locations in which electricity is unreliable or inaccessible are in desperate need of light at night to see things such as textbooks, and to improve safety, and also desperately need sources of electricity to charge phones or other devices for communication. The World Bank estimates that families and individuals in developing countries that lack access to a functioning electrical grid spend an average of 30% of their disposable income on energy such as kerosene lamps, acid cell batteries, and diesel generators, which are costly and inefficient.

Accordingly, the embodiments presented herein provide a portable lamp and device charger powered by a battery that is in turn charged by a solar panel or by a wall outlet. In particular, present invention embodiments include a lamp that may open from a flat square to a cube with a twist-and-pull motion. An expandable or foldable origami-like cube with a cubic light diffuser is transformed from two flat squares connected by folded polygonal planes by a simple pull-and-rotate motion applied to the two squares to form the cube-shaped diffuser and light. In some embodiments, one square of the six-sided cube contains a solar panel with a printed circuit board assembly (PCBA), a light source such as one or more light emitting diodes (LEDs), and includes ports such as Universal Serial Bus C (USB-C) ports for receiving wall outlet power and/or for charging an external device. The origami-like cube, when flat-packed, can be used as an on-the-go source of power and/or light, and can be inserted into a carrying bag/backpack that has a transparent pocket for inserting the flat cube to enable the solar panel to harness energy from the sun. The flat-packed apparatus, when used in the pocket of the bag, can also be used as a caution light for people walking in the dark or on their bikes, so that drivers and pedestrians may be alerted to their presence.

Present invention embodiments can be easily shipped and stored in a flat configuration that occupies little space, which is particularly useful for shipping after a natural disaster and/or in during transit outdoors. Thus, present invention embodiments can be easily transported along with other disaster relief supplies. Another advantage of present invention embodiments is that some embodiments can easily expand into a large lighting device, cost-effectively replacing conventional sources of illumination such as flashlights and kerosene lanterns. The embodiments presented herein may also reduce the amount that individuals spend on energy by capturing and storing freely-available solar energy.

The present lamp can be charged using either solar power or wall outlet power. The present lamp can also be charged while housed in the back pack shoulder bag front pocket while one is wearing the bag. This embodiment can be used in tandem with the shoulder bag/backpack for travel on the go access to light or power. The backpack is designed with a front EVA pocket which fits inside the flat packed origami cube.

The embodiments presented herein can be used by campers and hikers for outdoor uses as a rechargeable, easy transportable light and energy source. The embodiments presented herein may be substantially waterproof and can therefore be used in water activities. The embodiments presented herein can also be used as a household lamp and device charger, or as a pool, garden or landscape light. Present invention embodiments may not require a pump or mouth to inflate the diffuser, thereby eliminating risk of the transmission of diseases such as Ebola, Cholera, *E. coli*, and Zika.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIGS. 1A-1D are views in perspective depicting a lamp 500 being unfolded from a collapsed state in accordance with an embodiment of the present invention. FIGS. 1A-1D provide a three-dimensional view of an origami-style foldable cube with a solar panel 200 and PCBA 300 with its configuration expanding from flat to cube form with angles of approximately 90°. The lamp 500 can be configured as a cube in which two sides, the top assembly 210 and the bottom assembly 240, are rigid. The top assembly 210 includes a solar panel 200, and on the solar panel surface there is a button 340 (FIG. 1E) with seven settings: a first setting activates a warm white light which may be an approximately twenty lumen light. A second setting activates a bright white light which may be an approximately sixty lumen light. A third setting activates a warm white light which may be an approximately ninety lumen light. A fourth setting activates an approximately 180 lumen light. A fifth setting activates a light of approximately 400 lumens. A sixth setting activates a red light, and a seventh setting activates a red blinking light, which can blink in a pattern such as three blinks per second. The solar panel 200 and the PCBA 300 of top assembly 210, which are not shown in FIGS. 1A-1D, may be housed in a bladder made of a clear or substantially transparent material, such as ethylene-vinyl acetate (EVA) sheets, which may be substantially square-shaped and have dimensions of approximately 6.5"×6.5"×0.05". In other embodiments, other rigid and non-electrically conductive material may be utilized for the bladder.

Figure 1D:
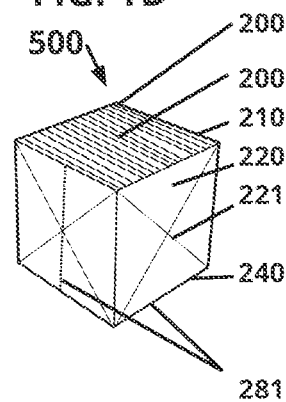
Figure 1E:
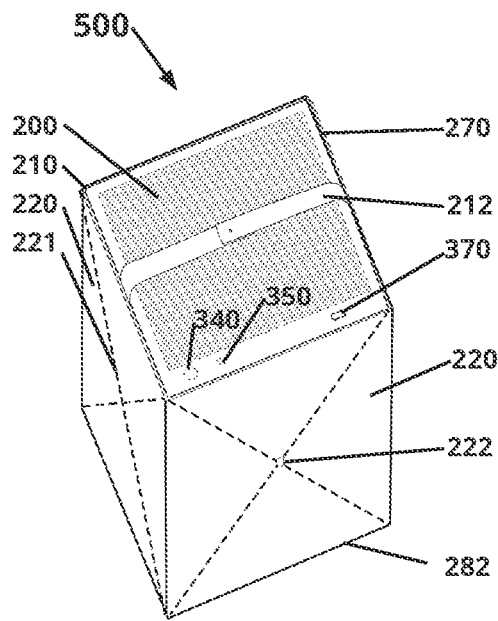
FIG. 1E is a view in perspective depicting a lamp, with the top side facing up, in accordance with an embodiment of the present invention.
Figure 1F:
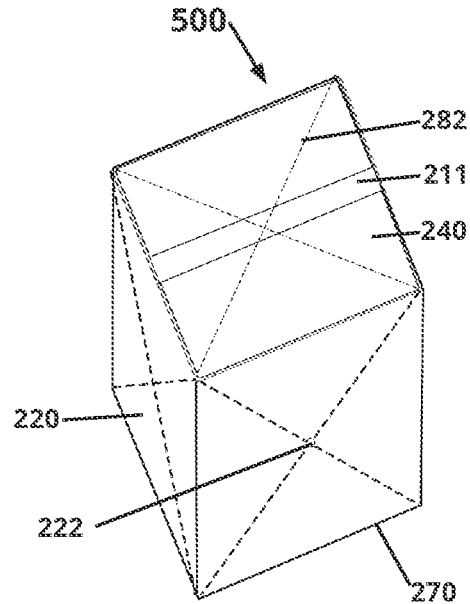
FIG. 1F is a view in perspective depicting a lamp, with the bottom side facing up, in accordance with an embodiment of the present invention.

FIG. 1E is a view in perspective depicting a lamp 500, with the top side facing up, in accordance with an embodiment of the present invention. As depicted, FIG. 1E shows an origami-style foldable lamp 500 in a cube configuration with the top assembly 210 that includes solar panel 200 and PCBA 300 on the opposite side. In some embodiments, the solar panel 200 and PCBA 300 form a frame of about 6.5"×6.5" with a thickness of about 1/16" to 1/8". In some embodiments, the dimensions of lamp 500 in the opened cube form is 6.5"×6.5"×6.5", and in the flat pack form, the dimensions of lamp 500 are 6.5"×6.5"×0.4"–0.5". Referring again to FIG. 1A, FIG. 1A shows the flat pack configuration as viewed from above and to the side. FIGS. 1D-1F show the origami-style expansion of lamp 500 as lamp 500 is opened and expanded by applying a twisting motion while separating the top assembly 210 and the bottom assembly 240. The bottom assembly may include a clear EVA handle 211.

FIG. 1F is a view in perspective depicting a lamp 500, with the bottom side facing up, in accordance with an embodiment of the present invention. FIG. 1F may depict an embodiment corresponding to the embodiment depicted in FIG. 1E with the bottom side facing up to depict bottom assembly 240 with clear handle 211.

In some embodiments, the top assembly 210 is a frame housing the solar panel, and has an adjustable handle 212. The handle 212 may be composed of EVA and/or can be composed of the same material as used for the top assembly 210 housing the solar panel and PCBA. Additionally or alternatively, the bottom side of the cube, a rigid square bottom assembly 240, may include a handle, which can be composed of EVA. FIGS. 1E and 1F depict the handle(s), which may serve to assist in expanding and collapsing the expandable bladder 220 in order to flat pack into the origami-style cube configuration of lamp 500.

On the top of the cube, the top assembly 210 may be affixed by attaching the EVA bladder surrounding the top assembly 210 with sonic and/or friction welding: in some embodiments, the EVA bladder is attached to another strip of EVA 271 that is sewn, adhered, or otherwise attached to the polyethylene terephthalate (PET) expandable diffuser 220; the face of the cube that includes the solar panel 200 and PCBA 300 may also be referred to herein as the top assembly 210 or top of the cube. Weld 270 may include a sonic or friction weld to attach materials of diffuser 220 to each other and/or to portions of top assembly 210 and bottom assembly 240. The face of the cube opposite the top is the bottom assembly 240, and may include a rigid PET square in between a bladder material. In some embodiments, two layers of material, such as PET sail cloth, are utilized in the bottom assembly 240 of the cube. The top assembly 210 preferably has a size slightly smaller than the size of the bladder around top assembly 210. The solar panel 200 may include a photovoltaic panel, such as a polycrystalline silicone or monocrystalline silicone. In various embodiments, the solar panel 200 may produce any desired wattage, such as ten watts, and may have a predetermined or estimated life cycle, such as a fifteen-year life cycle.

Thus, lamp 500 can be collapsed into a flat square configuration, for easy shipping, convenient carrying, and/or cost and space savings.

The faces of the cube that fold and expand through folded planes when twisted or rotated in either direction are referred to herein as the sides of the cube. The top assembly 210 with solar panel 200 and PCBA 300, and/or the bottom face 240, may be rotated to produce a collapsing or folding form of the sides of the cube as shown in FIGS. 1A-1D and also depicted and described in further detail with reference to FIGS. 10A-10D. The expandable diffuser 220 forms the sides of the cube.

In some embodiments, the PCBA 300 (FIG. 4) includes a button 340, LEDs 310, 320, and 330, an indicator light 350, a battery 380, a charging port 360, and a removable cover 370. The button 340 controls power to LEDs 310, 320, and 330. In some embodiments, there are 48 LEDs in total: twenty warm white LEDS 310 with kelvin color temperature of approximately 4000K-5000K, twenty bright white LEDs 320 with Kelvin color temperatures of approximately 3000K-3900K, and eight RED color LEDs 330. The LEDs 310, 320, and 330 are depicted and described in further detail with reference to FIG. 4.

In some embodiments, indicator light 350 provides a light to indicate one or more statuses of battery 380. For example, indicator light 350 may indicate with a solid blue light that the battery is charged, and a blinking blue light may indicate that the battery is charging.

Battery 380 may include any conventional or other rechargeable battery. In some embodiments, battery 380 includes a lithium-ion polymer battery having a capacity of approximately 4000 mAh-6000 mA and a life cycle of approximately 25,000-50,000 hours. Battery 380 is depicted and described in further detail with reference to FIG. 4.

Charging port 360 may include any standard or other port for transferring energy in the form of electricity. In some embodiments, charging port 360 includes a USB port such as a USB-C port. Charging port 360 can be used to charge battery 380 with a compatible cord (e.g., a USB-C cord) for rapid charging via a wall outlet connected to a power grid, or from other sources of power, such as a diesel generator. Charging port 360 is depicted and described in further detail with reference to FIG. 4.

Removable cover 370 protects charging port 360 from environmental sources of damage, such as dust and/or moisture. Removable cover 370 may be composed of a semi-flexible material, such as silicone, to facilitate inserting and removing. Removable cover 370 may cover the charging port 360 when not in use, and may be removed when inserting a cord for charging. Removable cover 370 is depicted and described in further detail with reference to FIG. 4.

Expandable diffuser 220 may function as a bladder to protect the interior of lamp 500, and is formed of a translucent material such as polyethylene terephthalate (PET), polylactic acid (PLA), ethylene vinyl acetate (EVA) or thermoplastic polyurethane (TPU). Diffuser 220 is folded and connected as depicted and described in further detail with reference to FIGS. 2A-3B, 6A, 7A, and 7B. Diffuser 220 may be substantially transparent, flexible, expandable and collapsible. Diffuser 220 functions to diffuse light from LEDs 310, 320, and/or 330, protecting eyes from possible harm from the intense light emitted by LEDs 310, 320, 330. Diffuser 220, when fully opened into its cube-like configuration, may possess dimensions of about 6.5"W×6.5"D×6.5" H.

Figure 2A:
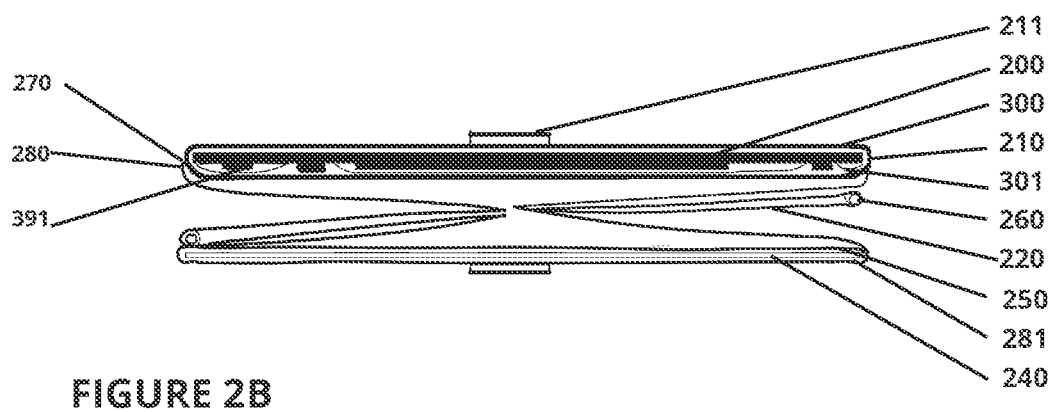
FIG. 2A is a view in section depicting a lamp in a collapsed configuration in accordance with an embodiment of the present invention.

FIG. 2A is a view in section depicting a lamp 500 in a collapsed configuration in accordance with an embodiment of the present invention. FIG. 2A includes diffuser 220 fully folded into its collapsed configuration between top assembly 210 and bottom assembly 240.

Figure 2B:
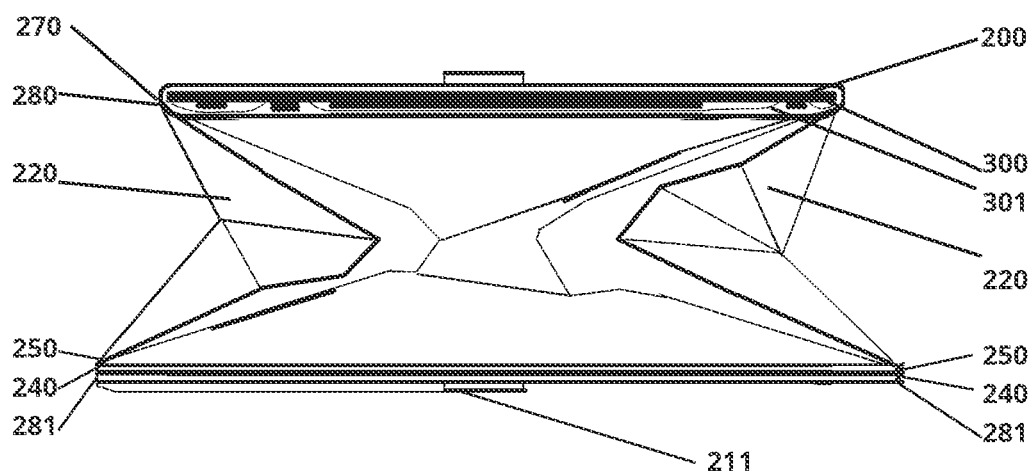
FIG. 2B is a view in section depicting a lamp in a semi-collapsed configuration in accordance with an embodiment of the present invention.

FIG. 2B is a section view depicting a lamp 500 in a semi-collapsed configuration in accordance with an embodiment of the present invention.

Figure 3A:
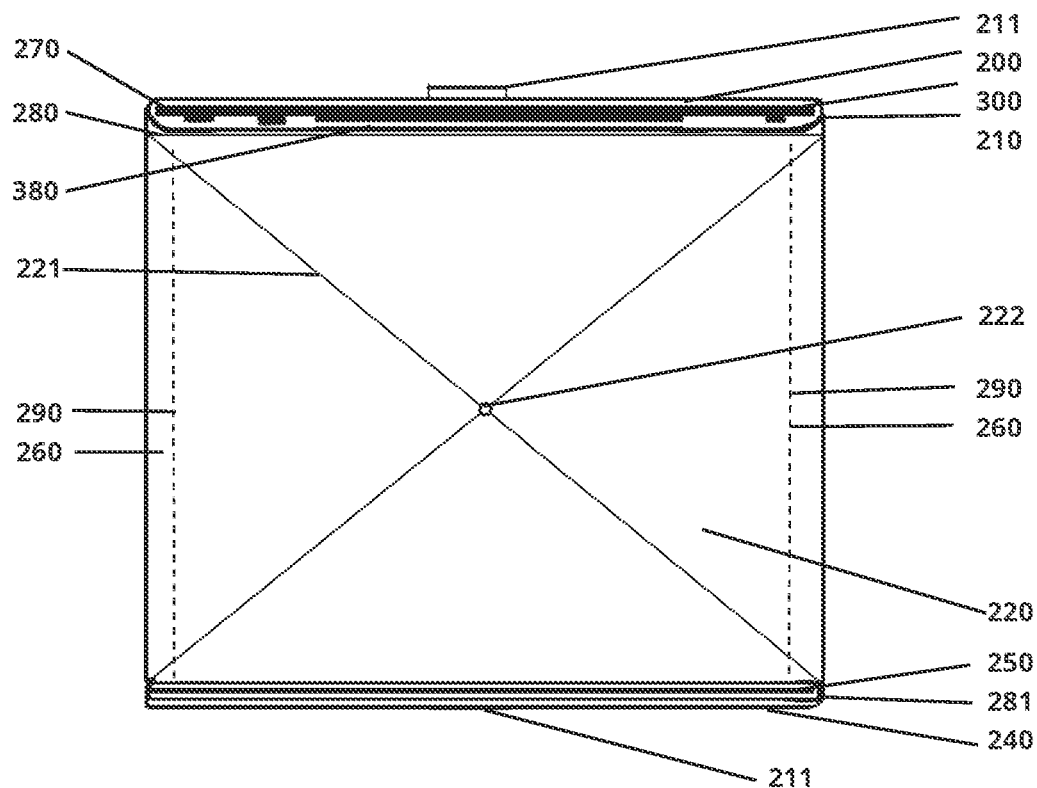
FIG. 3A is a side view in section depicting a lamp in a fully expanded configuration in accordance with an embodiment of the present invention.

FIG. 3A is a side view in section depicting a lamp 500 in a fully expanded configuration in accordance with an embodiment of the present invention. The fully expanded configuration may be substantially in the shape of a cube.

Figure 3B:
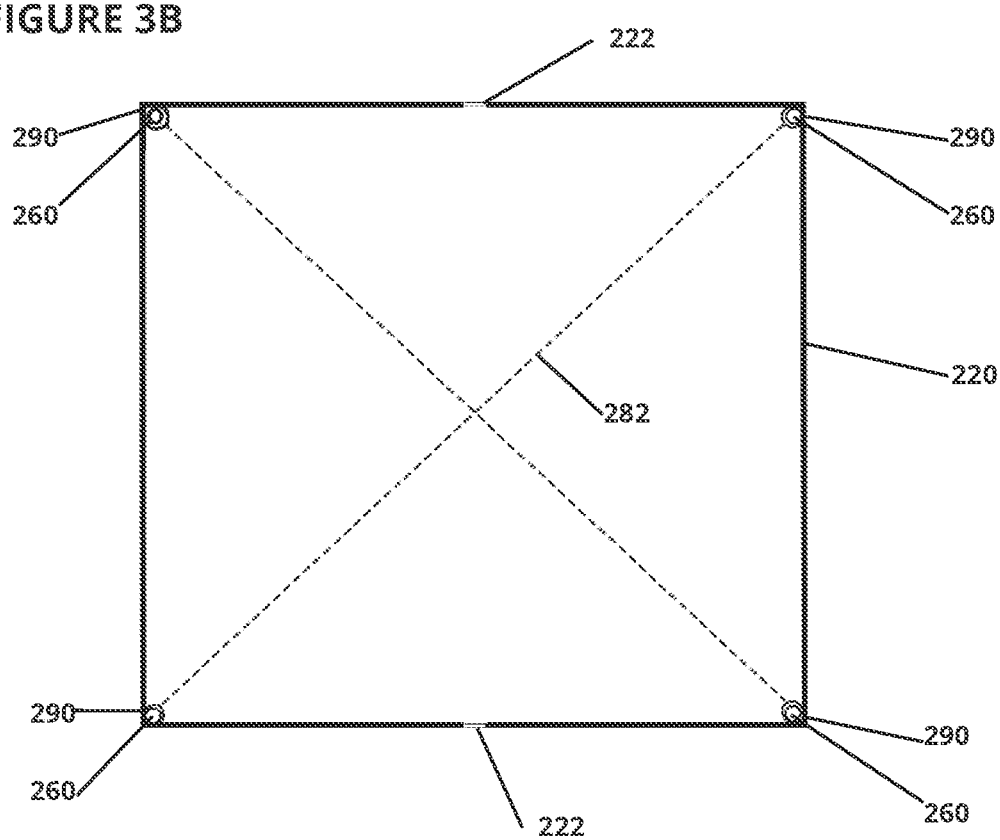
FIG. 3B is a view in section depicting a lamp in a fully expanded configuration in accordance with an embodiment of the present invention.

FIG. 3B is a view in section depicting a lamp 500 in a fully expanded configuration in accordance with an embodiment of the present invention. When opened to form an angle of about 90°, this view shows the four rods 260 housed in respective sleeves 290 to reinforce the corner edges of the cube. These rods 260 may remain substantially straight when the diffuser 220 expands or collapses. FIG. 3B may depict a view that corresponds to the embodiment depicted in FIG. 1E.

Figure 4:
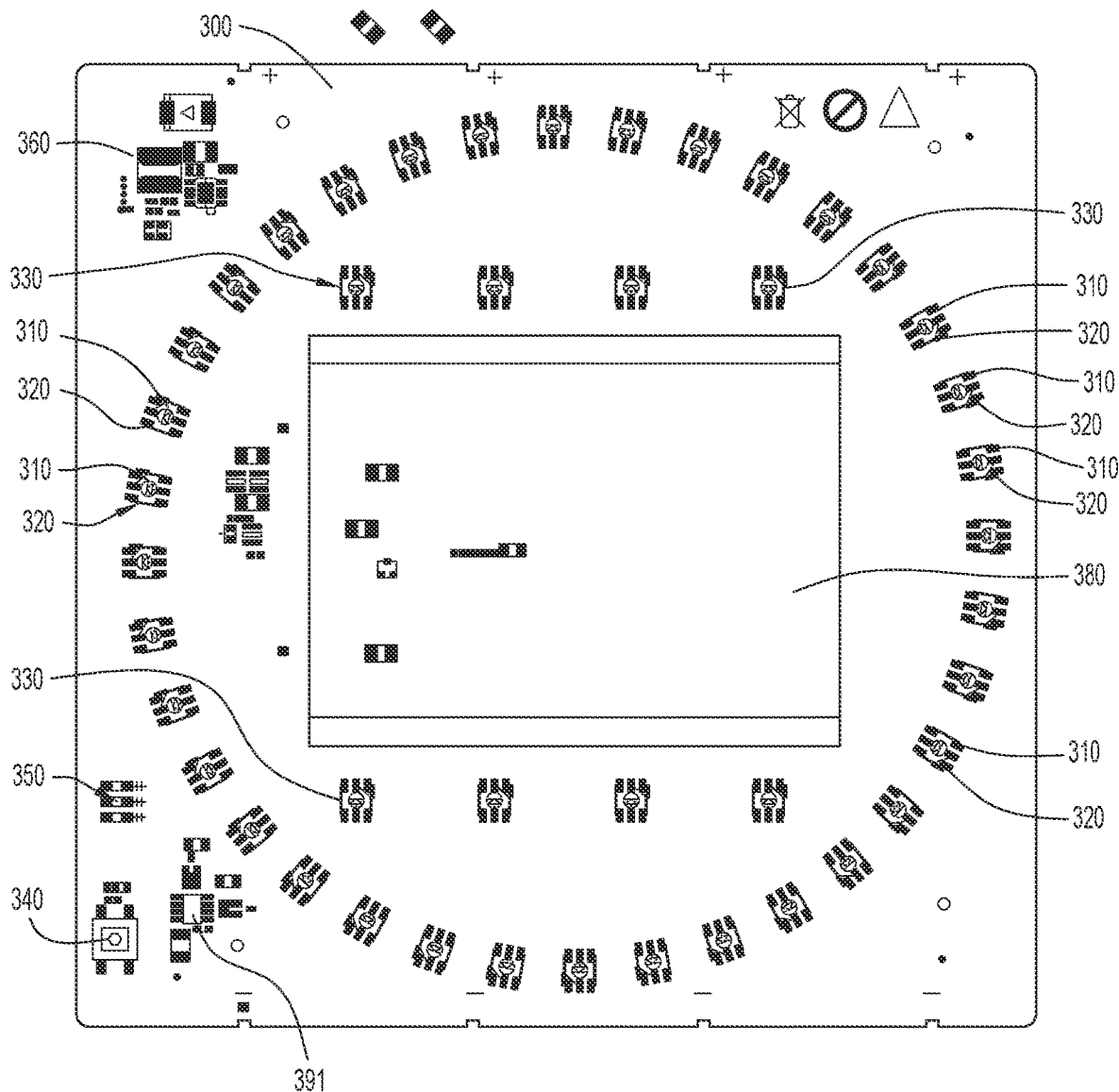
FIG. 4 is a top view of a printed circuit board assembly (PCBA) in accordance with an embodiment of the present invention.

FIG. 4 is a top view of PCBA 300 in accordance with an embodiment of the present invention. In some embodiments, all four edges of the square are sonic or friction welded and the items affixed thereto and, except for diffuser 220, are together referred to as top assembly 210, which may be snugly enclosed within rectangular transparent bladder that serves to protect top assembly 210 from water and dust. The transparent bladder is formed of a transparent material such as EVA, TPU, or PVC. The bladder of assembly 210 may be substantially transparent to enable light to pass to the photovoltaic cells of solar panels 200 so that solar panels 200 provide power to charge the battery 380.

In some embodiments, top assembly 210 has one opening covered by a removable cover 370. When removable cover 370 is removed, charging port 360 is exposed so that electrical connections can be formed via charging port 360.

The top assembly 210 includes PCBA 300, which can be affixed to the inside or underside of the solar panel 200. PCBA 300 may be formed of an electrically insulating material, and serves to mount components and to support electrical connections between the components. In some embodiments, the components mounted on the PCBA 300 include LEDs 310, 320, and 330, battery 380, processor 391, and integrated circuit components, such as one or more resistors capacitors and/or triodes.

LEDs 310, 320, and 330 may include forty-eight total LEDs: twenty LEDs 310 that provide a warm white light, twenty LEDs 320 that provide a bright white light, and eight LEDs 330 that provide a red light. Four LEDs 330 with the red color may be positioned in a line on either side of the battery 380 forming two lines total with four LEDS in each line. In some embodiments, LEDs 310 and 320 may be arranged symmetrically in a circular shape with a diameter of approximately 6". Together, LEDs 310, 320, and 330 may provide approximately 80-500 lumens of light with a life cycle of about 25,000-50,000 hours. In one embodiment, LEDs 310 provide warm white light, LEDs 320 provide bright white light, and LEDs 330 provide red light, while in other embodiments, some or all LEDs 310, 320, 330 provide white light and/or colored light of one or more desired colors.

Battery 380 may include any conventional or other rechargeable battery for receiving solar power from solar panel 200 and/or for receiving wall-outlet power via charging port 360, for storing the received power, and/or for providing power to LEDs 310, 320, and 330, indicators 350, charging port 360, and/or other electrical components discussed herein. In some embodiments, battery 380 is capable of being charged and discharged for at least 3,000-10,000 cycles. Battery 380 may be a lithium-ion rechargeable battery type. In some embodiments, battery 380 supplies at least 4000-10,000 mAh while operating in an environmental temperature of −20° C. to 70° C. Thus, for example, battery 380 may simultaneously power two smart phones or other electronic devices such as wireless phones, wireless headphones, a tablet computer, or a laptop computer. Battery 380 may provide sufficient power to operate LEDs 310, 320, and 330 for approximately 24 to 48 hours on a low setting, and for approximately 18 to 20 hours on a high setting. In some embodiments, battery 380 may fully charge after ten hours of exposure to sunlight, depending on conditions such as weather, orientation with respect to the sun, and the like.

Processor 391 may include any general purpose or special-purpose computer processor that can execute instructions in order to operate in accordance with present invention embodiments. In particular, processor 391 may control LEDs 310, 320, and 330 and/or indicators light 350.

PCBA 300 may include components such as resistors, capacitors and triodes (not shown) for enabling battery 380, processor 391, and/or other associated components to operate in accordance with present invention embodiments. In some embodiments, processor 391 may not be included, and an integrated circuit is configured to control LEDs 310, 320, and 330 and/or indicator 350 in accordance with present invention embodiments.

Each group of LEDs 310 and 320 of PCBA 300 may include a respective white reflector 301 positioned adjacent to the LEDs 310 and 320. Reflector 301 may be formed of any suitable reflective material, or may include a thin reflective coating, and reflectors 301 may include concave surfaces surrounding holes centered on LEDs 310, 320, and/or 330. Concave surfaces can serve to increase the amount of light reflected from the portions of reflectors 301 around LEDs 310, 320, and/or 330.

In some embodiments, PCBA 300, solar panel 200, reflectors 301, and/or other components discussed herein are enclosed by a transparent bladder to form assembly 210.

Continuing with reference to FIG. 4, FIG. 4 is a circuit schematic generally showing how the components of the lamp are electrically connected. Solar panel 200 and/or charging port 360 provide power to battery 380. Battery 380 stores the power and, in turn, provides the stored power to charging port 360 and processor 391. Battery 380 may include a sensor to determine the amount of charge remaining, which can be provided to processor 391.

A button 340 toggles power to LEDs 310, 320, and/or 330 to control the emission of light. In some embodiments, button 340 can be actuated multiple times to cycle through operating patterns. In one embodiment, a first actuation activates a low light setting of approximately 45 lumens to approximately 80 lumens, a second actuation activates a high light setting of approximately 500 lumens, and a third actuation activates blinking light setting, e.g., for emergency use, that is approximately 500 lumens. A low light setting is provided by either turning on only a subset of all LEDs 310, 320, 330, or by providing less power to LEDs capable of emitting different amounts of light. In another embodiment, an operating pattern may include a first actuation that turns on four white LEDs and indicator 350, a second actuation that turns on all white LEDs and indicator 350, a third actuation that turns on only colored LEDs and indicator 350, a fourth actuation that turns off all LEDs but turns on indicator 350, and a fifth actuation that turns off all LEDs and turns off indicator 350. In some embodiments, button 340 is configured to prevent accidental actuation, e.g., by providing sufficient mechanical resistance to being moved and/or being concave so as to minimize accidental actuation by an adjacent object.

Indicator light 350, depicted in FIG. 4 as a single indicator, can be turned on and off by processor 391 to indicate how much charge remains in battery 380 based on the battery sensor reading received by processor 391. Indicator 350 may be different colors, e.g., red for indicating very low charge, blue for indicating partial charge, green for indicating substantially full charge, and/or white for indicating charging is occurring from wall outlet power. In another embodiment, indicator light 350 blinks while battery 380 is charging. Indicator light 350 may present a solid light when the charge of battery is above a threshold level of charge, such as 90-100%. In some embodiments, indicator light 350 will blink when the battery is charging via charging port 360 or via ambient light.

Figure 5A:
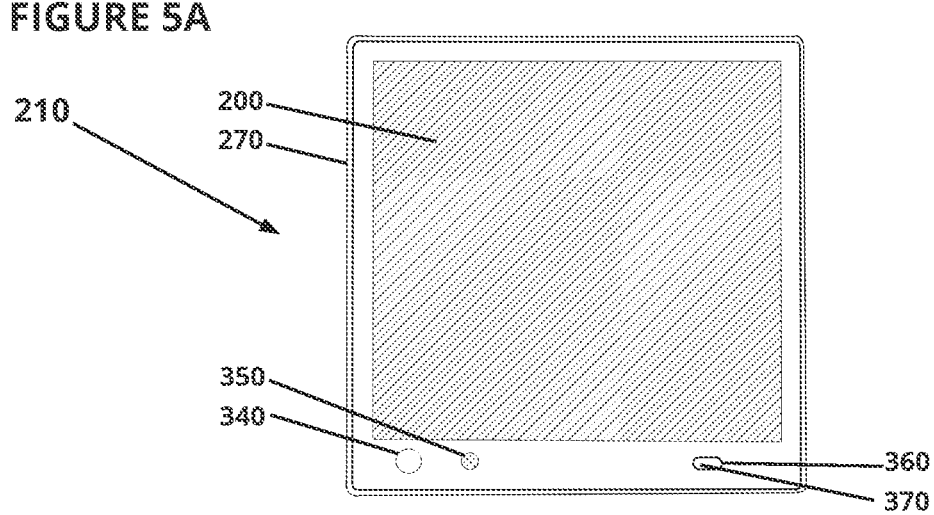
FIG. 5A is a top view depicting a lamp in accordance with an embodiment of the present invention.
Figure 5B:
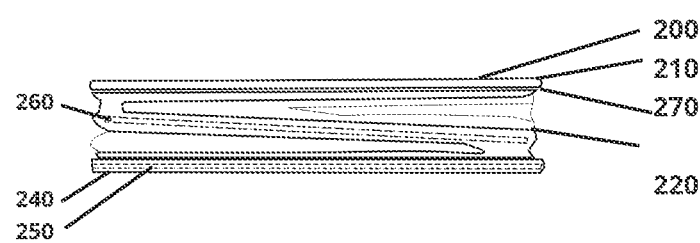
FIG. 5B is a side view depicting a lamp in a collapsed configuration in accordance with an embodiment of the present invention.
Figure 5C:
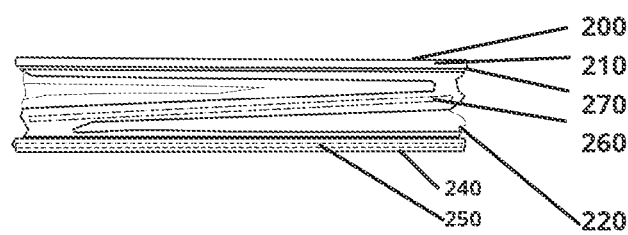
FIG. 5C is a side view depicting a lamp in a collapsed configuration in accordance with an embodiment of the present invention.
Figure 5D:
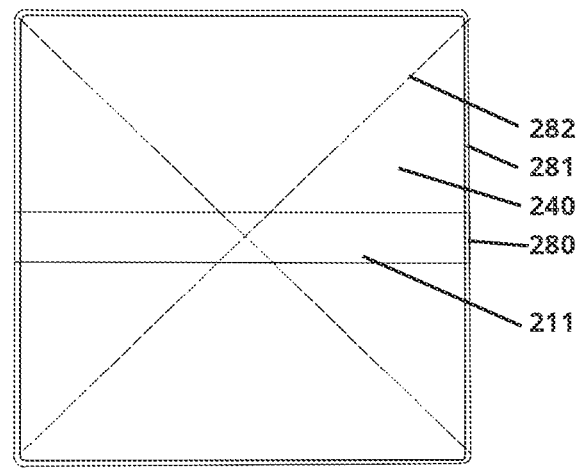
FIG. 5D is a bottom view of a lamp in accordance with an embodiment of the present invention.

FIGS. 5A-5D provide other views of lamp 500 in a collapsed configuration. FIG. 5A is a top view depicting a lamp 500 in accordance with an embodiment of the present invention. FIG. 5B is a side view depicting a lamp 500 in a collapsed configuration in accordance with an embodiment of the present invention. FIG. 5C is a side view depicting a lamp 500 in a collapsed configuration in accordance with an embodiment of the present invention. FIG. 5C may depict another view of the embodiment depicted in FIG. 5B; in particular, FIG. 5C may show the side opposite the side of lamp 500 depicted in FIG. 5B. FIG. 5D is a bottom view of a lamp 500 in accordance with an embodiment of the present invention. The views depicted in FIGS. 5A-5D also depicts a clear handle 211 that is attached to the bottom assembly. The handle 211 can be used to facilitate the expanding and contracting of the diffuser by pulling or pushing with the user's hand inserted between the handle and the bottom square. The material layers of the bottom assembly 240 can be attached together through the middle with two diagonal seams 282 going through all three layers.

Figure 6A:
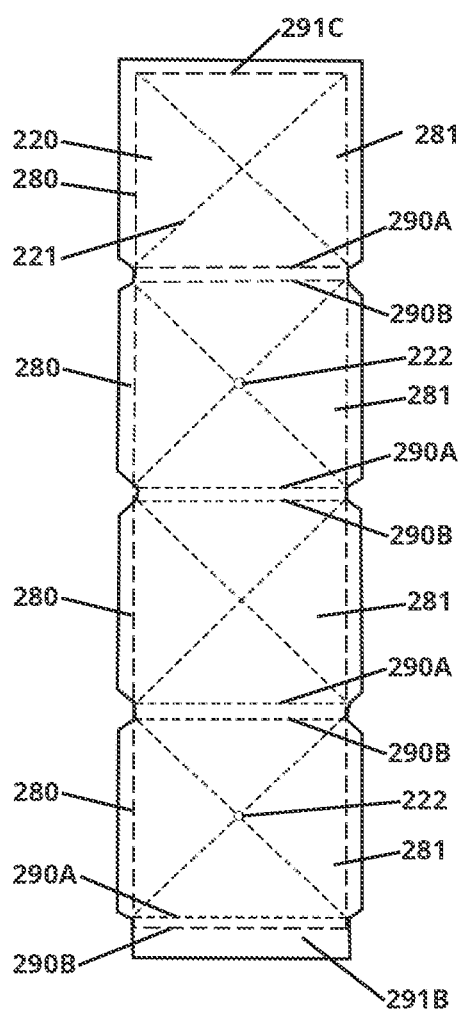
FIG. 6A is a view depicting an unfolded diffuser with fold lines indicated in accordance with an embodiment of the present invention.

FIG. 6A is a view depicting an unfolded diffuser with fold lines indicated in accordance with an embodiment of the present invention. As depicted, FIG. 6A shows the diffuser before connection to top assembly 210 and bottom assembly 240. A small circular hole 222 of about ⅜" diameter can be provided in diffuser 220, such as in the center of two panels of diffuser 220, to allow of air flow in and out while transforming the lamp 500 from a flat configuration to an expanded cube configuration and vice versa.

Figure 6B:
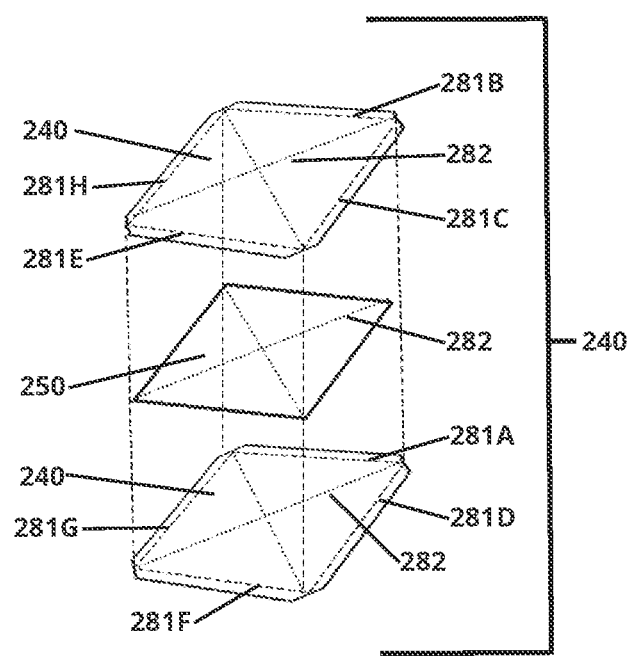
FIG. 6B is an exploded view depicting layers of a bottom assembly of a lamp in accordance with an embodiment of the present invention.

FIG. 6B is an exploded view depicting layers of a bottom assembly 240 of a lamp 500 in accordance with an embodiment of the present invention. The layers of the bottom assembly comprise of one layer of PET sail cloth square 241; one ridged clear square 250, having dimensions of approximately 6"×6"×¹⁄₁₆", and another layer of PET sailcloth 241. The layers are attached together by sewn seams 282, which may be diagonal to each other.

Referring to an embodiment depicted in FIGS. 6A and 6B, ends 291C and 291B of diffuser 220 may be connected by a sewn seam of sleeve 290. To form the sleeve, seam 290A is sewn to seam 290B. Corresponding edges 281A and 281B, edges 281C and 281D, edges 281E and 281F, and edges 281G and 281H may be sealed together to form bottom assembly 240, which can be attached to edge 281.

As shown in FIG. 6A, diffuser 220 is defined by a longitudinal, flat multifaceted material having a first end 291C and a second end 291B. This structure is folded along fold lines 221.

Fold lines 221 may include valley folds where the side surfaces directly adjacent to the fold line is folded up creating a valley. The first and second ends 291C and 291B can expand and contract the origami-like diffuser to form an expandable, foldable six-sided cube so that a seal can be created between the edge of the inner surface of expandable diffuser 220, edge of top assembly 210, and edge of bottom assembly 240, to the edges of the diffuser 220 surface at edge 281 on 220 and corresponding edges 281A and 281B, edges 281C and 281D, edges 281E and 281F, and edges 281G and 281H.

Diffuser 220 may include parallel long edges seams 281 and 280, and parallel along edge fold/seam lines of ends 291C and 291B. Diffuser 220 may also include parallel valley fold lines to encourage collapsing of lamp 500. The full assembly and form of an embodiment of lamp 500, including all of its components, is shown in FIGS. 1A-F.

In one embodiment, the dimensions of diffuser 220 include a length of approximately 26-28 inches for edge 281, and a height of 6.5 inches for the diffuser.

Operation of lamp 500 will now be discussed.

Beginning from a flat-pack configuration (e.g., as shown in FIGS. 1A, 5B, and 5C), lamp 500 is expanded by pulling and rotating top assembly 210 or bottom assembly 240 apart, so that top assembly 210 or bottom assembly 240 rotate from approximately 90 degrees along the horizontal axis of the square top assembly 210 or bottom assembly 240. The pull and twist action transforms lamp 500 into the configuration depicted in FIG. 1E, wherein solar panel 200 can be exposed to ambient light or sunlight. Solar panel 200 converts ambient light or sunlight to an electrical charge and transfer the charge to battery 380 for storage.

Continuing to pull and rotate top assembly 210 and bottom assembly 240 results in unfolding the sides out to form the four sides of the cube, which is the configuration that is depicted in FIGS. 1A-1D in which diffuser 220 is fully expanded into a cube-like shape. Light from LEDs 310, 320, and/or 330 may be maximally dispersed in this configuration, and can be used e.g., for general-purpose lighting.

To return lamp 500 from its fully-opened cube-like configuration to its flat pack square-like configuration, top and bottom assemblies 210 and 240 are simply pushed and rotated together.

In some embodiments, after battery 380 has at least some charge from solar panels 200 and/or charging port 360, an external device (not shown) can be connected to charging port 360, so that the charge stored in battery 380 provides power to the external device.

In some embodiments, after battery 380 has at least some charge from solar panel 200 and/or charging port 360, depressing button 340 causes processor 391 to control indicator light 350 to indicate the amount of charge in battery 380 and to illuminate LEDs 310 to provide a warm light color in a first setting, such as a low light setting, or a candle setting of about 20 lumens. Depressing button 340 a second time causes processor 391 to illuminate LEDs 320 to provide bright white color in a second setting, such as a medium light setting of 60 lumens. Depressing button 340 a third time causes processor 391 to illuminate LEDs 310 to provide warm light color in a third setting, such as a 100 lumens setting. Depressing button 340 a fourth time causes processor 391 to illuminate LEDs 320 to provide a bright light color of approximately 160-200 lumens in a fourth setting. Depressing button 340 a fifth time causes processor 391 to illuminate LEDs 310 to provide bright light color of approximately 500 lumens in a fifth setting. Depressing button 340 a sixth time causes processor 391 to illuminate LEDs 330 red light color of 80-100 lumens in a sixth setting. Depressing button 340 a seventh time causes processor 391 to illuminate LEDs 330 red light color to blinking with minimum of 3 blinks per second, with seventh setting, this setting is for emergency or distress signal. Depressing button 340 an eighth time causes processor 391 to turn off indicators 350 and return lamp 500 to its passive state wherein LEDs 310, 320, and 330 are deactivated and solar panel 200 may continue to convert ambient light to charge for storing power in battery 380.

If the LEDs 310, 320, and/or 330 operate, and/or an external device (not shown) is powered via charging port 360, until charge in battery 380 is depleted, lamp 500 may automatically return to its passive state, e.g., as if button 340 had been depressed an eighth time. In some embodiments, at any time in the sequence of settings the button 340 can be pressed and held for a duration of time, such as for three seconds, to turn off the lamp 500 without having to cycle through all seven settings.

In another embodiment, an origami-like foldable and expandable solar lamp 500 includes subassemblies which are joined to form a tight bladder around the two solar panels which are on both sides of the cube. The origami-like expandable and foldable surfaces can be expanded from a first configuration in which they are closed together, compact for storage and shipment, to a second configuration in which they are opened to form a lamp having a cube shape.

Figure 7A:
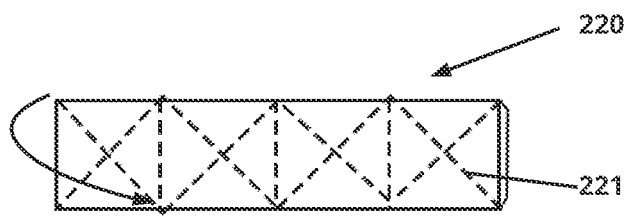
FIGS. 7A-7E depict a folding pattern sequence for training the diffuser material to stay rigid yet foldable for expanding the lamp from a collapsed configuration in accordance with an embodiment of the present invention.
Figure 7B:
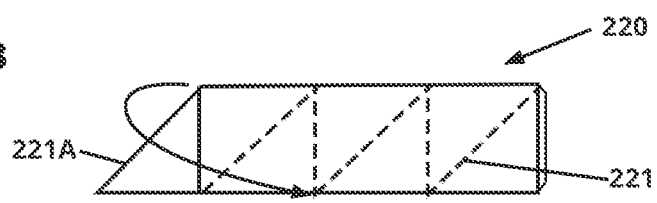
Figure 7C:
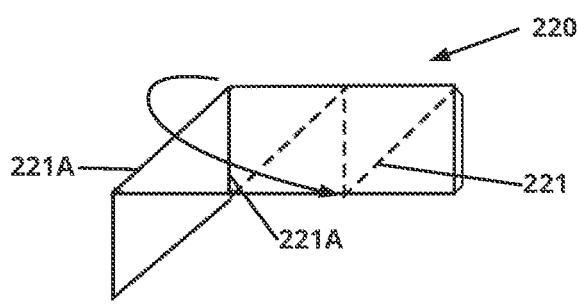
Figure 7D:
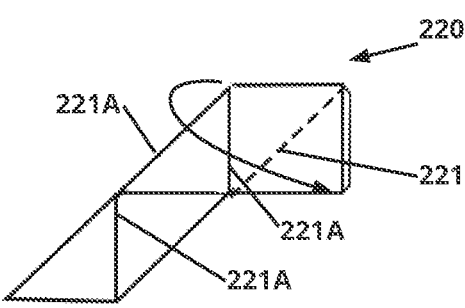
Figure 7E:
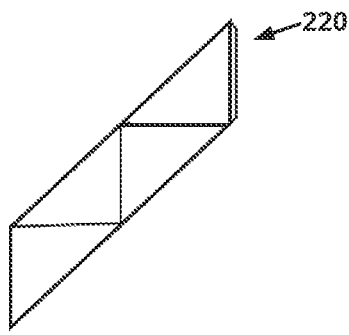

FIGS. 7A-7E depict a folding pattern sequence for training the diffuser material to stay rigid yet foldable for expanding the lamp from a collapsed configuration in accordance with an embodiment of the present invention. The folding sequence may train the diffuser 220, which can be composed of a PET sailcloth material, to rotate and fold into a flat square configuration and to expand into a cube configuration. Dashed lines indicate folds lines 221 for a valley fold (e.g., a fold that forms a trench), as is commonly used in origami instructions. As shown in FIG. 7A, diffuser 220 is folded into four approximately square-shaped sections, and two additional fold lines 221 are provided into each square-shaped section running from opposite corners. As shown in FIGS. 7B-7E, diffuser 220 may be folded along the diagonal lines 221 (specifically, along the same diagonal line 221, running from a top right corner to a bottom left corner, for each square-shaped section) to train the material of diffuser 220. In some embodiments, diffuser 220 may additionally be trained by folding on the other diagonal lines 221 (e.g., the lines not shown as being folded in the sequence of FIGS. 7B-7E) to complete the training of diffuser 220.

The edge of expandable diffuser 220 is attached and is sealed to edges of top assembly 210 and bottom assembly 240 to edge 281 and corresponding edges 281A and 281B, edges 281C and 281D, edges 281E and 281F, and edges 281G and 281H are sealed together to form bottom assembly 240, which can be attached to edge 281. Flat bottom assembly 240 may also enable LEDs 310, 320, and/or 330 to transmit light through the material and through the origami-like diffuser 220. The dashed diagonal fold lines 221 indicate where the sides of the cube fold inwardly. The solid lines show the folded edge of the PET material 221A in the training sequence, then unfolded to then be sewn in assembly shown in FIG. 9.

Figure 7F:
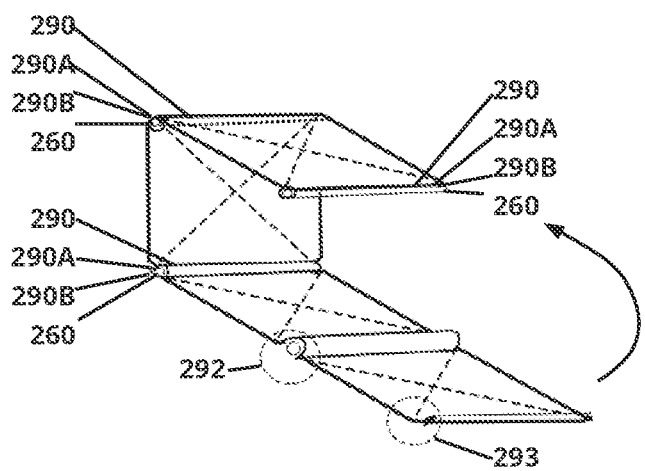
FIG. 7F depicts a partially folded material pattern of an expandable diffuser in accordance with an embodiment of the present invention.
Figure 7G:
FIG. 7G is an enlarged view depicting details of a rigid tube or rod inserted into a sleeve of a corner seam of the expandable diffuser in accordance with an embodiment of the present invention.
Figure 7H:
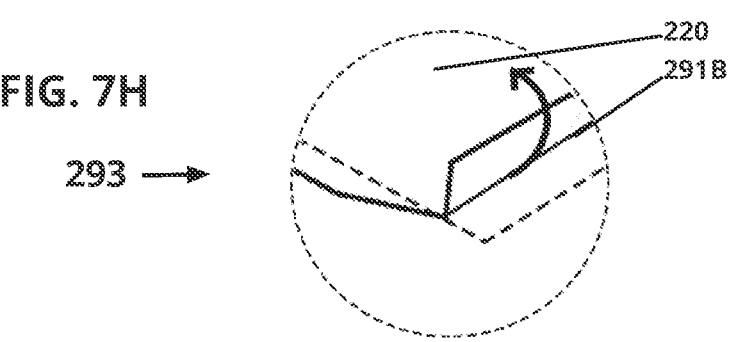
FIG. 7H is an enlarged view depicting a fold of the bladder material of the diffuser that provides a seam for a sewn connection to assemble the bladder into a four-sided cube in accordance with an embodiment of the present invention.

FIG. 7F depicts a partially folded material pattern of an expandable diffuser 220 in accordance with an embodiment of the present invention. FIG. 7G is an enlarged view depicting details of rigid tube or rod inserted into a sleeve of a corner seam of the expandable diffuser 220 in accordance with an embodiment of the present invention. This will provide a rigid corner for each of the four corners of the cube and will assist in the expanding and collapsing motions. FIG. 7H is an enlarged view depicting a fold of the bladder material of diffuser 220 that provides a seam for a sewn connection to assemble the diffuser 220 into a four-sided cube in accordance with an embodiment of the present invention As shown in FIGS. 7F-7H, the cube-shaped configuration of diffuser 220 enables the lamp to be positioned so as to stand in an upright position. Top assembly 210 and bottom assembly 240 may be fabricated from materials that are substantially transparent, flexible, foldable, lightweight, and collapsible, yet strong enough to hold a form. The corners of the cube have a sleeve 290 that is sewn as a tube on the corners to allow a rigid rod or tube 260 to be inserted at the corners. The rod or tube 260 may enable the cube to rotate and expand easily as the four corners have the added structure of the rods to remain straight while the cube is transformed from a flat configuration to an expanded cube configuration. Seam lines 290A and 290B are sewn to each other to form a sleeve to fit a rigid rod or tube 260 at the corners of the diffuser 220.

FIGS. 8A and 8B are views depicting a top assembly 210 including a bladder 209 encasing a solar panel 200 and PCBA 300 between two layers of a flexible material in accordance with an embodiment of the present invention. In one specific embodiment, an origami-like expandable and foldable diffuser 220 defines a generally multifaceted cube with six sides and is formed from one consistent surface with valley and mountain folds that create the triangulated sides of the cube, enabling a folding motion from a cube configuration to a flat, collapsed, compact square configuration. Top assembly 210 includes a solar panel 200 and PCBA 300, which are inserted into an inner bladder 209. The material of bladder 209 is transparent and allows the sunlight to charge the photovoltaic cells on the front solar panels and also allows the LED lights on the back of the solar panel to emit light through the material 209 and through diffuser 220. This bladder 209 may protect the solar panel 200 and PCBA 300 from water and dust.

PCBA 300 may be positioned on the back surface of the solar panel 200. PCBA may include rechargeable battery 380, LEDs 310, 320, and 330, and one or more capacitors, resistors, and/or triodes (not shown). Some elements of top assembly 210 may be exposed externally, including button 340 and charging port 360. The top assembly 210 also includes a power indicator light 350, which may be comprised of LEDs, and solar panel 200 is electrically connected to PCBA 300.

Figure 9:
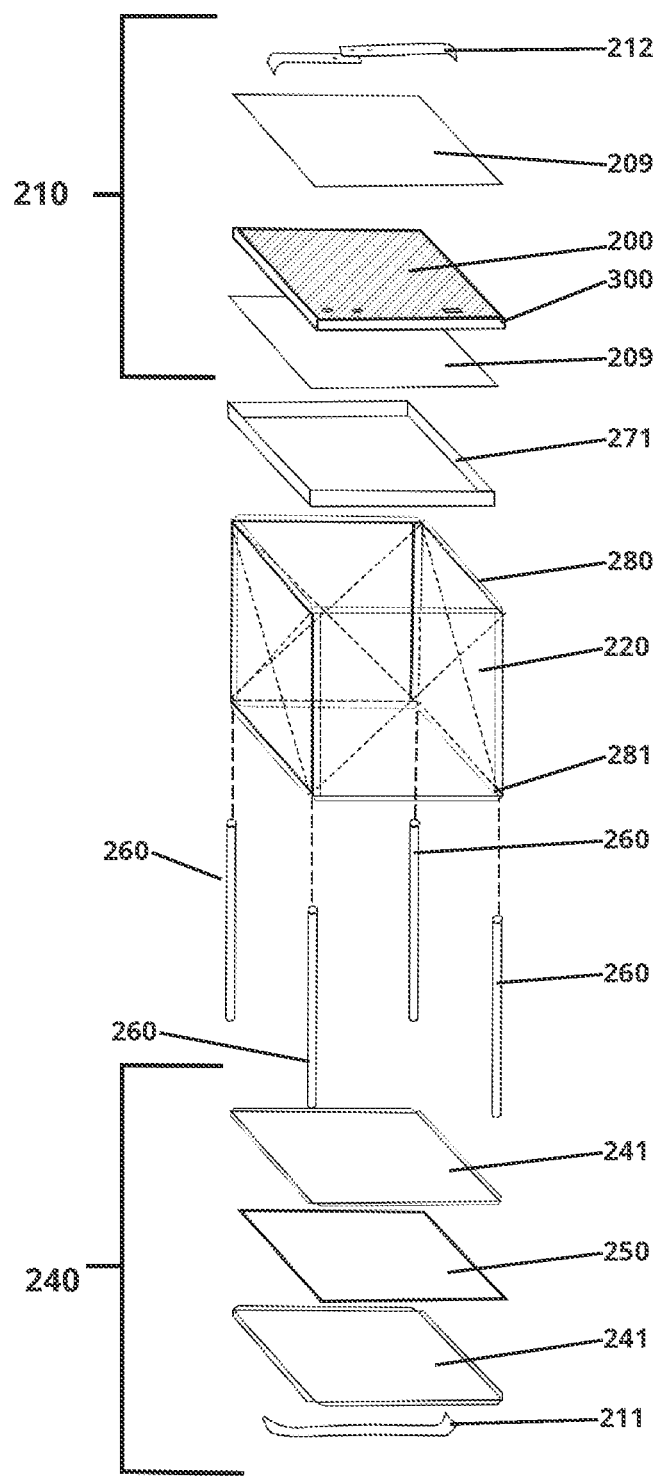
FIG. 9 is an exploded view depicting layers of a lamp in accordance with an embodiment of the present invention.

FIG. 9 is an exploded view depicting layers of a lamp 500 in accordance with an embodiment of the present invention. As depicted, FIG. 9 includes components of lamp 500, starting from the top assembly 210, with solar panel 200 and PCBA 300 and the sides of the cube made from one sheet of PET sail cloth 241 to make origami-like light diffuser 220 to promote diffusion of light from LEDs 310, 320, and/or 330, and to protect solar panel 200 and PCBA 300 from water and dust. In some embodiments, the geometric pattern of folds includes a translucent material and may be made of PET, PLA, EVA, TPU, and/or other suitable materials or combinations of materials. Top assembly 210 may be sealed so that the lamp both floats and is substantially waterproof. In particular, lamp 500 may be able to float on the surface of a pool and can be submerged under water without affecting operability. Charging port 360 may include a removable cover 370 that can prevent water from entering the bladder. Top assembly 210 is connected to the diffuser 220 by heat sealing a strip of EVA 271 to the top assembly bladder on one edge and sewing the strip of EVA to the edge of the diffuser 220.

FIGS. 10A-10D show views of the inside folds of the expandable bladder diffuser 220 from above and side when the top and bottom are removed for this view. These drawings show the folded pattern of inside folds of expandable diffuser from flat packed to expanded cube form as the top or bottom is rotated 0-45-80-90 degrees. The top side of the cube 210 can be rotated in either direction from the position shown in 10A. FIG. 10A shows the folded planes of the expandable bladder diffuser as it is flat packed in the square form. FIG. 10C shows the rotation of the top or bottom sides rotated 80 degrees. FIG. 10D shows the top view down and side view top square side rotated 90 degrees on the horizontal axis to fully opened cube form.

FIGS. 10A-10D are top views of a folding sequence for an expandable bladder with open top and bottom sides in accordance with an embodiment of the present invention. FIGS. 10E-10H are side views in elevation of a folding sequence for an expandable bladder with open top and bottom sides in accordance with an embodiment of the present invention. FIGS. 10E-10H may correspond to the embodiment depicted in FIGS. 10A-10D (i.e., FIG. 10E corresponds to FIG. 10A, FIG. 10F corresponds to FIG. 10B, FIG. 10G corresponds to FIG. 10C, and FIG. 10H corresponds to FIG. 10D).

The origami-like diffuser 220 includes an expandable and foldable diffuser material which has sides with diagonal fold lines which is formed from a plurality of fold subassemblies. The ordered sequence of FIGS. 10A, 10B, 10C and 10D, and corresponding FIGS. 10E, 10F, 10G, and 10H, depict the expanding of diffuser 220 as the folds on the diagonal fold lines 221 fold outwardly from a collapsed state to form an approximate cube. Diffuser 220 collapses in the reverse order (e.g., according to the ordered sequence of FIGS. 10D, 10C, 10B and 10A, and corresponding FIGS. 10H, 10G, 10F, and 10E). When collapsing or expanding, the corners remain straight and rigid while the cube-shaped configuration of diffuser 220 expands or contracts. The rigid upright corners may remain straight and twist diagonally to rest flat when compressed. The corners twist in the opposite direction during expansion, becoming erect for the cube-shaped configuration of diffuser 220.

When lamp 500 is compressed from the cube-shaped configuration to the flat configuration, the diagonal fold lines 221 of diffuser 220 become valleys (as the material of diffuser 220 is trained to fold) and move inwardly (e.g., toward the center of lamp 500). When expanded, the diagonal fold lines 221 of diffuser 220 unfold from the valleys to a non-folded orientation. See, e.g., FIGS. 1A-1D, which show the valleys of fold lines 221 disappearing as lamp 500 is expanded. Additionally, the rigid rod or tubes 260, which run approximately the length of each edge of diffuser 220 from the top assembly 210 to the bottom assembly 240 of lamp 500, swing downwardly toward an adjacent corner in the direction in which lamp 500 is twisted. When a twisting motion is applied that twists top assembly 210 in a clockwise (or counter-clockwise) direction relative to bottom assembly 240, the top end of each rigid rod or tube 260 will swing down and toward a corner of bottom assembly 240 that is the corner immediately adjacent, in a clockwise (or counter-clockwise) direction, to the corner nearest the bottom end of that rod or tube 260. Thus, each rod or tube 260 is directed by the twisting motion from a position that is orthogonal to the top assembly 210 and bottom assembly 240 when expanded, to a position that is parallel to top assembly 210 and bottom assembly 240 when collapsed. See FIGS. 10A-10H, which show the change in the position of the vertical edges of diffuser 220, and therefore the change in the position of rigid rods or tubes 260 contained in sleeves therewith.

Figure 11:
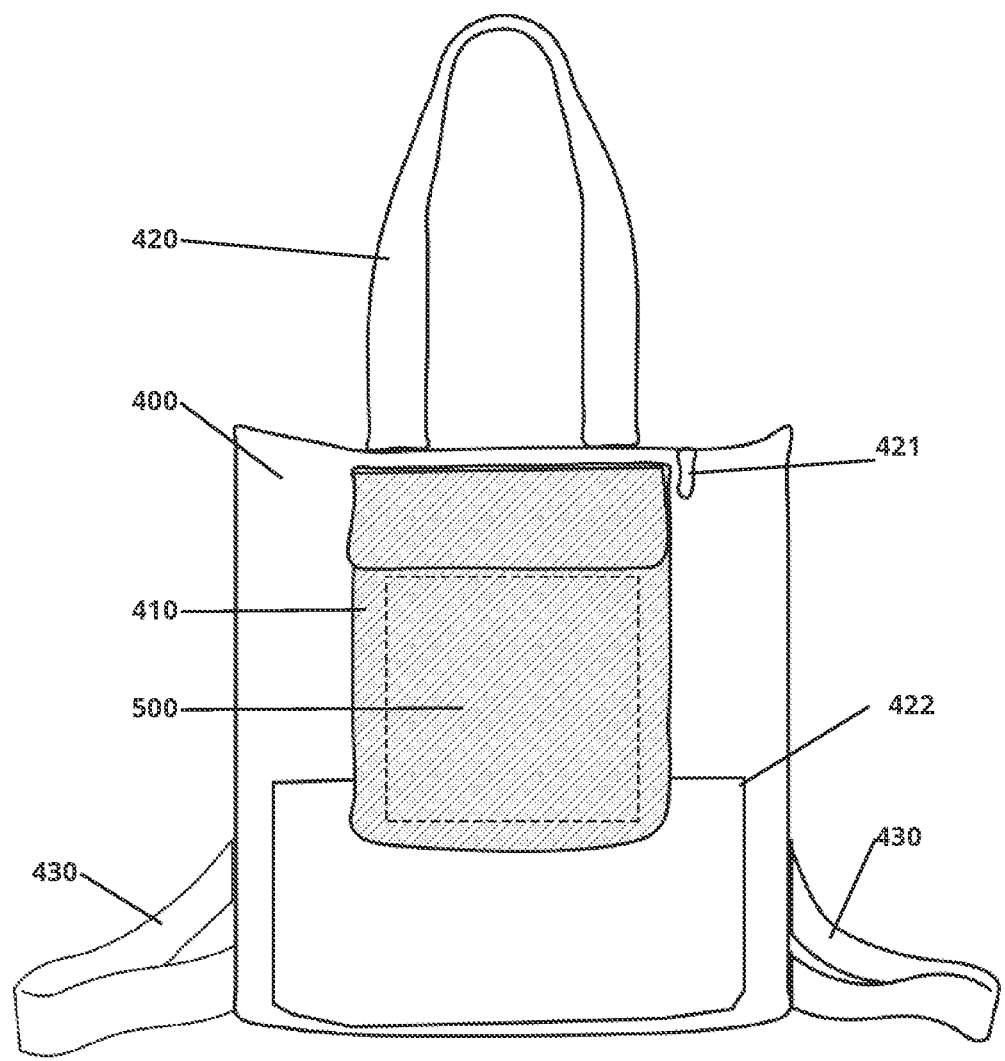
FIG. 11 is a front view of a shoulder bag/backpack with a transparent portion on the outside of the bag in accordance with an embodiment of the present invention.

FIG. 11 is a view depicting a front of a shoulder bag/backpack 400 with a pocket 410 on the outside of the bag in accordance with an embodiment of the present invention. As depicted, shoulder bag/backpack 400 includes a pocket 410, handles for using as a shoulder length bag 420, a keychain loop 421, an external pocket 422, and handles 430 for using as a backpack. Generally, the components of shoulder bag/backpack may be sewn together or otherwise affixed. Lamp 500 may be situated inside of pocket 410, which includes a transparent portion to enable light to pass onto solar panel 200 of lamp 500 and/or enables light from LEDs 310, 320, and/or 330 to be visible while lamp 500 is stored in pocket 410.

Figure 12:
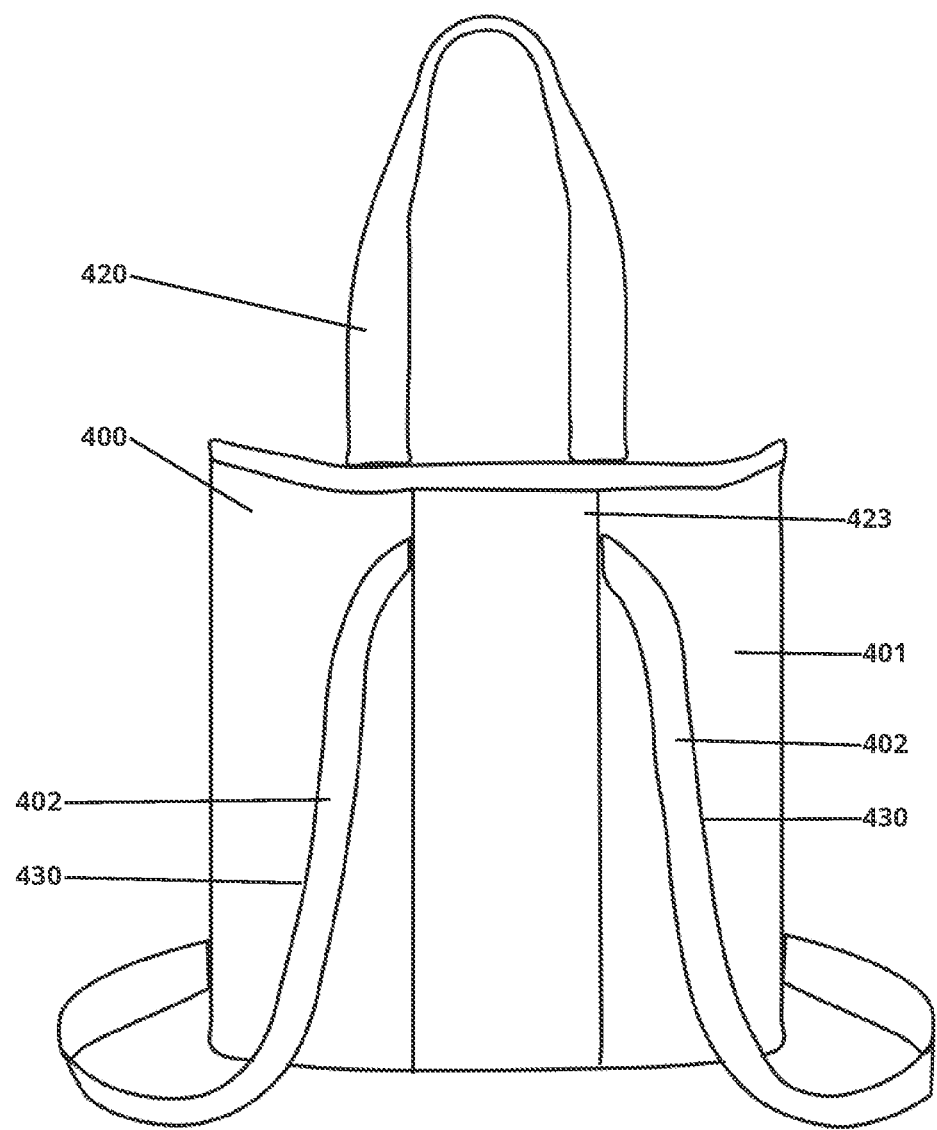
FIG. 12 is a rear view of a shoulder bag/backpack in accordance with an embodiment of the present invention.

FIG. 12 is a view depicting a back of a shoulder bag/backpack 400 in accordance with an embodiment of the present invention. As depicted, shoulder bag/backpack 400 includes a fabric 401, straps 402, a handle 420, a panel 423, and handles 430. Fabric 401 may include any fabric, such as a woven textile material, a non-woven material, a leather or faux leather material, and the like. Panel 423 enables handles 430 to be restrained so that shoulder bag/backpack 400 can be converted to a shoulder bag configuration.

Figure 13:
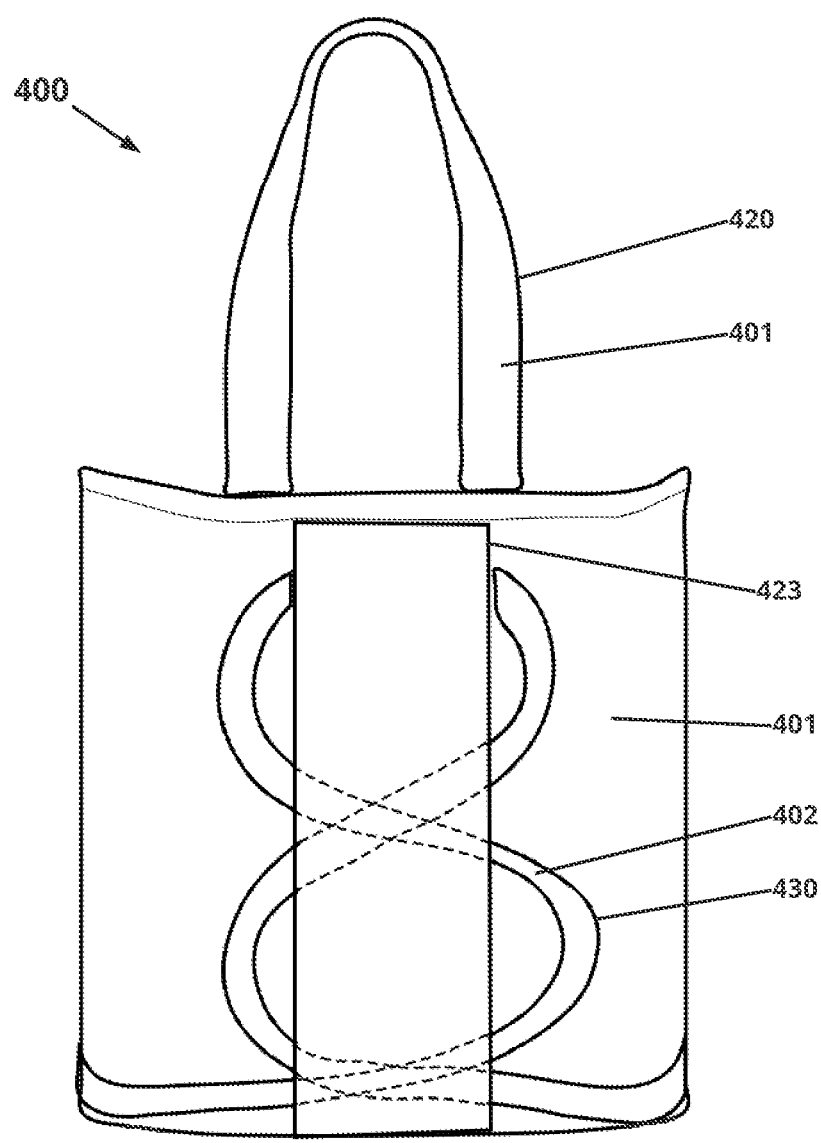
FIG. 13 is a rear view of a shoulder bag/backpack in the shoulder bag configuration in accordance with an embodiment of the present invention.

FIG. 13 is a view depicting a back of a shoulder bag/backpack 400 in the shoulder bag configuration in accordance with an embodiment of the present invention. Unlike a backpack configuration, handles 430 are restrained via panel 423 so that only handle 420 is available. For example, handles 430 may be tucked into panel 423, which may be affixed to shoulder bag/backpack 400 at a top and bottom portion and otherwise open on the side portions.

Figure 14:
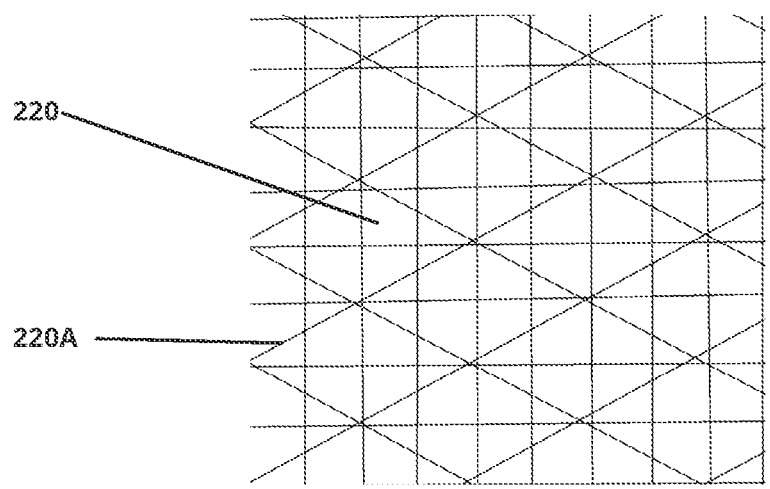
FIG. 14 is a view depicting a portion of the material of a diffuser in accordance with an embodiment of the present invention.

FIG. 14 is a view depicting a portion of the material of a diffuser 220 in accordance with an embodiment of the present invention. As depicted, diffuser 220 is a patterned fabric in which the pattern is defined according to the thread 220A. Thread 220A may be threaded through diffuser 220 and/or may be laminated onto, or otherwise affixed to, diffuser 220. In some embodiments, diffuser 220 is composed of a substantially waterproof material, such as a sailcloth fabric. In some embodiments, diffuser 220 is composed of PET, and thread 220A is a PET thread.

As shown in FIG. 14, thread 220A may be positioned to provide a pattern by forming a rectilinear grid of thread 220A and a diamond pattern formed by positioning lines of thread 220A diagonal to the rectilinear lines of thread 220A. In some embodiments, the vertical lines of thread 220A are spaced approximately 6 mm apart, and the horizontal lines are spaced approximately 6 mm apart. In some embodiments, the diagonal lines are angled at 30 degrees counter-clockwise from the horizontal lines and 150 degrees counterclockwise from the horizontal lines. In some embodiments, the diagonal lines may be spaced farther apart than the horizontal and/or vertical lines; in one embodiment, the diagonal lines are spaced approximately twice as far apart as the spacing between horizontal and/or vertical lines, or approximately 12 mm apart.

Figure 15:
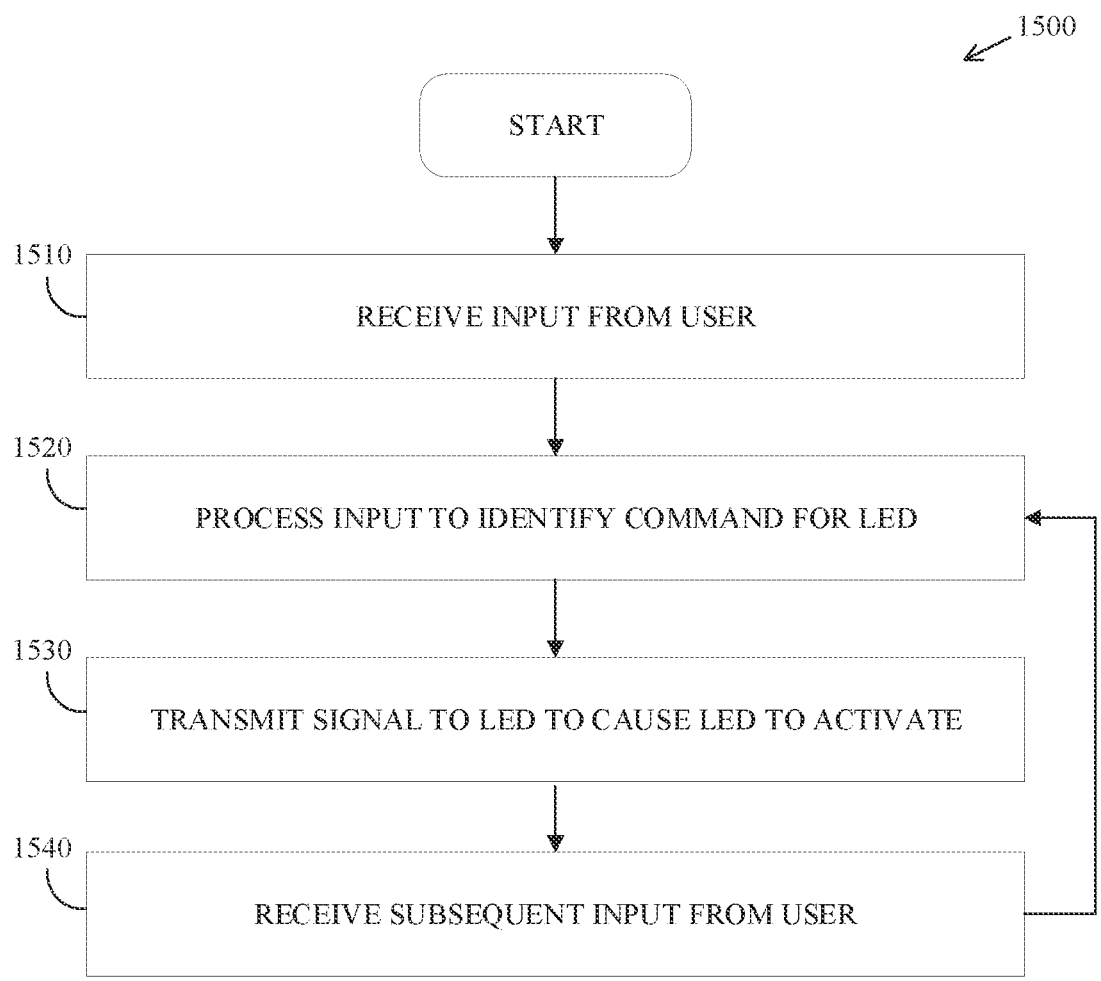
FIG. 15 is a flow chart depicting a method of actuating a lamp in accordance with an embodiment of the present invention.

FIG. 15 is a flow chart depicting a method 1500 of actuating a lamp in accordance with an embodiment of the present invention.

Input is received from a user at operation 1510. A user may actuate button 340 to provide an input to processor 391. In some embodiments, the input corresponds to a single actuation of button 340; in other embodiments, the input may corresponding to a group of actuations of button 340 that are performed by the user over a certain amount of time or within a certain amount of time of each other.

The input is processed to identify a command for one or more LEDs at operation 1520. In some embodiments in which the input corresponds to a single actuation of button 340, processor 391 may determine a count of previous actuations in order to select a command. For example, if button 340 has been pressed twice before, then another received input corresponds to three actuations; thus, a command corresponding to a third setting (e.g., activating a warm white light of approximately ninety lumens) is selected. In some embodiments in which a group of actuations is received, processor 391 may determine a count of the number of actuations (e.g., three actuations in a row) and select a command corresponding to a third setting (e.g., activating a warm white light of approximately ninety lumens).

In some embodiments, the current number of actuations (as counted since the last deactivation of LEDs 310, 320, and 330), or the number of actuations in a group, may correspond to a command that causes one or more LEDs (e.g., LEDs 310, 320 and/or 330) to enter the following mode or setting: a first setting corresponds to one actuation and activates a warm white light which may be an approximately twenty lumen light; a second setting corresponds to two actuations and activates a bright white light which may be an approximately sixty lumen light; a third setting corresponds to three actuations and activates a warm white light which may be an approximately ninety lumen light; a fourth setting corresponds to four actuations and activates an approximately 180 lumen light; a fifth setting corresponds to five actuations and activates a light of approximately 400 lumens; a sixth setting corresponds to six actuations and activates a red light; a seventh setting corresponds to eight actuations activates a red blinking light, which can blink in a pattern such as three blinks per second; and an eighth setting corresponds to eight actuations, and causes LEDs 310, 320, and 330 to no longer emit light. In some embodiments, a long-press actuation, such as holding down button 340 for three seconds or more, corresponds to a setting in which LEDs 310, 320, and 330 no longer emit light.

A signal is transmitted to the one or more LEDs to cause the one or more LEDs to activate accordingly at operation 1530. Depending on the signal, the one or more LEDs may be activated, may change an amount of light, color of light, and/or temperature of light that is emitted, may activate a blinking pattern for one or more LEDs, or one or more active LEDs may be deactivated.

Subsequent input is received from a user at operation 1540. A user may provide subsequent input by actuating button 340, and processor 391 may process the subsequent input to identify a new command for the LEDs. Once a new command is identified at operation 1520, a corresponding signal may be transmitted to the one or more LEDs at operation 1530, and processor 391 may continue to wait for subsequent input to process. In some embodiments, when no input has been received for a predetermined amount of time, processor 391 may transmit a signal to cause any active LEDs to deactivate. Thus, for example, when lamp 500 is left on and unattended for a predetermined length of time, such as thirty minutes, one hour, six hours, etc., the LEDs may automatically be deactivated in order to conserve energy.

In some embodiments, processor 391 may process input that is not provided by a user, but is based on a battery or charging status, and may transmit a signal to one or more LEDs accordingly. In particular, processor 391 may receive input indicating that battery 380 is charging via solar panel 200 at above a threshold rate, or processor 391 may receive input indicating that battery 380 has been charged beyond a threshold amount by solar panel 200. In response, processor 391 may transmit a signal to deactivate one or more LEDs. Thus, for example, LEDs 310, 320, and/or 330 may be automatically deactivated in conditions in which there is enough ambient and/or solar light present to charge battery 380 beyond a desired threshold and/or at a desired rate.

Figure 16:
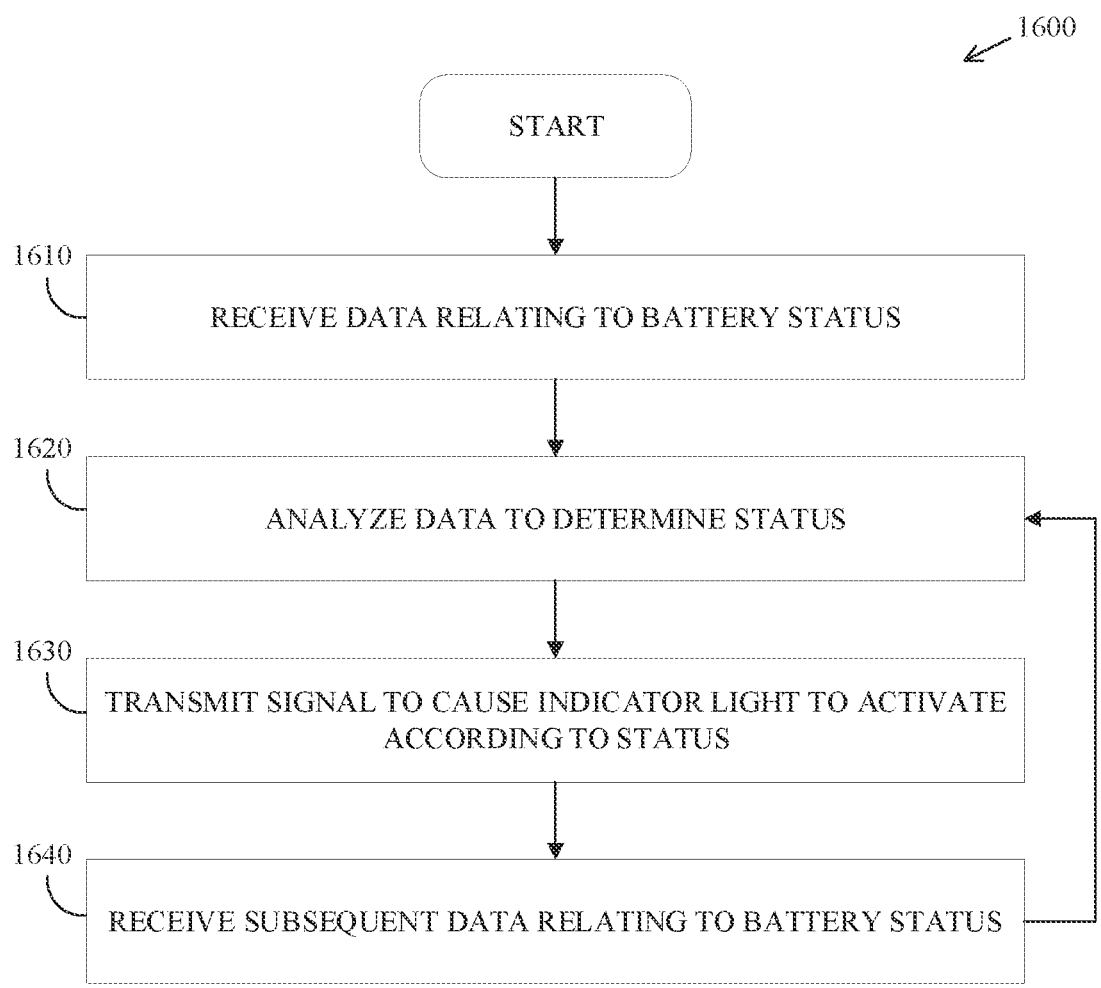
FIG. 16 is a flow chart depicting a method of displaying battery status in accordance with an embodiment of the present invention.

FIG. 16 is a flow chart depicting a method 1600 of displaying a battery status in accordance with an embodiment of the present invention.

Data relating to a status of a battery is received at operation 1610. A processor, such as processor 391, may receive data from battery 380 and/or from one or more sensors associated with battery 380. The data may indicate one or more of a current amount of energy stored in battery 380, a charging rate of battery 380, an estimated amount time until battery 380 is fully charged, an estimated amount of time until battery 380 is fully depleted, a percentage of charge of battery 380, a charging status of battery 380 (e.g., charging, charging by solar panel 200, charging by external power source via charging port 360, idle, in use, etc.), and the like.

The data is analyzed to determine a status of the battery at operation 1620. Processor 391 may analyze data relating to the battery's status to determine a corresponding signal to transmit to indicator light 350 to cause indicator light 350 to activate in a manner that is indicative of the battery's status.

A signal is transmitted to cause an indicator light to activate according to the status of the battery at operation 1630. Indicator light 350 may present a solid light of a particular color to indicate a status, may blink on and off a number of times or according to a pattern, or combinations thereof to indicate a status of the battery. In some embodiments, indicator light 350 receives a signal that causes indicator light 350 to emit a particular color of visible light, such as blue light, in a blinking pattern while battery 380 is charging, and indicator light receives another signal to cause indicator light 350 to emit the same color of light, or another color of light, continuously when battery 380 is fully charged. In some embodiments, indicator light 350 receives a signal that causes indicator light 350 to emit a red light when battery 380 falls below a certain amount or percentage of charge, such as below 25% of the total energy storage capacity of battery 380.

Subsequent data relating to the status of the battery is received at operation 1640. Data may be received continuously or according to a predetermined schedule, and the data can be analyzed by processor 391 to determine the status of battery 380. Thus, when battery 380 experiences a change in status, such as falling below a particular level of charge, a signal can be transmitted to indicator light 350 to update indicator light 350 accordingly.

In some aspects, the techniques described herein relate to an apparatus including: a photovoltaic panel configured to convert light into electricity; a battery configured to receive electricity from the photovoltaic panel and to store the electricity; a charging port configured to receive stored electricity from the battery and provide the stored electricity; at least one light emitting device configured to receive electricity from the battery and to emit light; a button configured to actuate the at least one light emitting device; and a diffuser surrounding the at least one light emitting device, wherein the diffuser diffuses light emitted by the at least one light emitting device, and wherein the diffuser has a first collapsed configuration and a second expanded configuration.

In some aspects, the techniques described herein relate to an apparatus, wherein the expanded configuration of the diffuser is cube-shaped including a first face, a second face opposite the first face, and four side faces extending between the first face and the second face.

In some aspects, the techniques described herein relate to an apparatus, wherein the photovoltaic panel is situated on the first face.

In some aspects, the techniques described herein relate to an apparatus, wherein each of the four side faces is square-shaped and includes a pair of diagonal fold lines, each diagonal fold line extending from one corner of the side face to an opposite corner of the side face.

In some aspects, the techniques described herein relate to an apparatus, wherein each edge of the diffuser that extends between the first face and the second face includes a rigid member that runs approximately a length of each edge.

In some aspects, the techniques described herein relate to an apparatus, wherein the at least one light emitting device emits one or more of: a white light, and a red light.

In some aspects, the techniques described herein relate to an apparatus, wherein the button is configured to actuate one or more of: a power setting of the at least one light emitting device, a warmth of the at least one light emitting device, a brightness of the at least one light emitting device, a blinking pattern setting of the at least one light emitting device, and a color setting of the at least one light emitting device.

In some aspects, the techniques described herein relate to an apparatus, wherein the at least one light emitting device includes a light emitting diode.

In some aspects, the techniques described herein relate to an apparatus, further including an indicator light configured to indicate a status of the battery.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. An apparatus comprising:
   a photovoltaic panel configured to convert light into electricity;
   a battery configured to receive electricity from the photovoltaic panel and to store the electricity;
   a charging port configured to receive stored electricity from the battery and provide the stored electricity;
   at least one light emitting device configured to receive electricity from the battery and to emit light;
   a button configured to actuate the at least one light emitting device; and
   a diffuser surrounding the at least one light emitting device, wherein the diffuser diffuses light emitted by the at least one light emitting device, wherein the diffuser has a first collapsed configuration and a second expanded configuration, and wherein the second expanded configuration of the diffuser is cube-shaped comprising a first face, a second face opposite the first face, and four side faces extending between the first face and the second face, and wherein the diffuser is expanded into the second expanded configuration by rotating the first face with respect to the second face and by pulling the first face apart from the second face.

2. The apparatus of claim 1, wherein the photovoltaic panel is situated on the first face.

3. The apparatus of claim 1, wherein each of the four side faces is square-shaped and includes a pair of diagonal fold lines, each diagonal fold line extending from one corner of the side face to an opposite corner of the side face.

4. The apparatus of claim 1, wherein each edge of the diffuser that extends between the first face and the second face includes a rigid member that runs approximately a length of each edge, and wherein each rigid member is inserted into a respective sleeve of the diffuser.

5. The apparatus of claim 1, wherein the at least one light emitting device emits one or more of: a white light, and a red light.

6. The apparatus of claim 1, wherein the button is configured to actuate one or more of: a power setting of the at least one light emitting device, a warmth of the at least one light emitting device, a brightness of the at least one light emitting device, a blinking pattern setting of the at least one light emitting device, and a color setting of the at least one light emitting device.

7. The apparatus of claim 1, wherein the at least one light emitting device includes a light emitting diode.

8. The apparatus of claim 1, further comprising an indicator light configured to indicate a status of the battery.

9. The apparatus of claim 8, wherein the status of the battery indicated by the indicator light includes one or more of: a charging status, and an amount of stored energy status.

10. The apparatus of claim 1, further comprising a printed circuit board assembly, wherein the battery, the photovoltaic panel, the at least one light emitting device, and the button are electrically connected to the printed circuit board assembly.

11. The apparatus of claim 10, wherein a bladder encases the printed circuit board assembly and the photovoltaic panel, and wherein the bladder is waterproof.

12. The apparatus of claim 10, wherein the printed circuit board assembly includes a processor that is configured to cause the at least one light emitting device to stop emitting light after a predetermined amount of time that the button has not received user input.

13. The apparatus of claim 1, wherein the diffuser is comprised of a sailcloth material.

14. The apparatus of claim 1, wherein the charging port is further configured to receive electricity from an external source, and wherein the battery is configured to store the received electricity.

15. The apparatus of claim 1, wherein the charging port is configured to provide the stored electricity to an external device.

16. The apparatus of claim 1, further comprising a hole that is provided in at least one of the four side faces extending between the first face and the second face, wherein expanding the diffusor into the second expanded configuration causes air to flow into the diffusor via the hole.

17. A method of distributing light from a light producing device comprising a photovoltaic panel, a rechargeable battery, a charging port, at least one light emitting device configured to emit light, and a diffuser surrounding the at least one light emitting device to diffuse light emitted by the at least one light emitting device, wherein the diffuser has a first collapsed configuration and a second expanded configuration, and wherein the second expanded configuration of the diffuser is cube-shaped comprising a first face, a second face opposite the first face, and four side faces extending between the first face and the second face, the method comprising:
- expanding the diffuser into the second expanded configuration by rotating the first face with respect to the second face and by pulling the first face apart from the second face;
- charging the rechargeable battery from the photovoltaic panel of the light producing device;
- charging a portable device in response to connection of the portable device to the charging port of the light producing device;
- receiving user input at a button of the light producing device;
- determining, based on the user input, a setting to control the at least one light emitting device to emit light with characteristics corresponding to the user input, wherein the characteristics include one or more from a group of a brightness, a color, and a pattern; and
- actuating the at least one light emitting device to apply the determined setting to emit light according to the characteristics corresponding to the user input.

18. The method of claim 17, wherein the user input is selected from a group of: a short button press, a long button press, and a plurality of button presses within a predetermined span of time.

19. The method of claim 17, wherein actuating the at least one light emitting device includes causing the at least one light emitting device to perform an action selected from a group of: emitting light at a first level of brightness, emitting light at a second level of brightness higher than the first level of brightness, emitting white light, emitting red light, emitting light in a steady manner, emitting light according to a blinking pattern, and deactivating the at least one light emitting device.

20. An assembly comprising:
- an apparatus, the apparatus comprising
  - a photovoltaic panel configured to convert light into electricity,
  - a battery configured to receive electricity from the photovoltaic panel and to store the electricity,
  - a charging port configured to receive stored electricity from the battery and provide the stored electricity,
  - at least one light emitting device configured to receive electricity from the battery and to emit light,
  - a button configured to actuate the at least one light emitting device, and
  - a diffuser surrounding the at least one light emitting device, wherein the diffuser diffuses light emitted by the at least one light emitting device, and wherein the diffuser has a first collapsed configuration and a second expanded configuration, and wherein the second expanded configuration of the diffuser is cube-shaped comprising a first face, a second face opposite the first face, and four side faces extending between the first face and the second face, and wherein the diffuser is expanded into the second expanded configuration by rotating the first face with respect to the second face and by pulling the first face apart from the second face; and
- a bag, wherein the bag includes a pocket configured to receive the apparatus, and wherein the pocket includes a transparent portion configured to permit light to pass through the transparent portion and to contact the photovoltaic panel.

* * * * *